US006675608B2

(12) United States Patent
Inoue et al.

(10) Patent No.: US 6,675,608 B2
(45) Date of Patent: Jan. 13, 2004

(54) ABSORPTION COLD OR HOT WATER GENERATING MACHINE

(75) Inventors: Naoyuki Inoue, Tokyo (JP); Tetsuya Endo, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/190,621

(22) Filed: Jul. 9, 2002

(65) Prior Publication Data

US 2003/0010049 A1 Jan. 16, 2003

(30) Foreign Application Priority Data

| Jul. 9, 2001 | (JP) | ......................... 2001-207758 |
| Aug. 31, 2001 | (JP) | ......................... 2001-262939 |
| Sep. 5, 2001 | (JP) | ......................... 2001-268432 |

(51) Int. Cl.[7] ............................................... F25B 15/00
(52) U.S. Cl. ........................................ 62/476; 62/238.3
(58) Field of Search ................................ 62/101, 238.1, 62/238.3, 476, 484, 494

(56) References Cited

U.S. PATENT DOCUMENTS

| 5,592,825 A | * | 1/1997 | Inoue ........................... 62/141 |
| 5,673,569 A | * | 10/1997 | Inoue ........................... 62/324.2 |
| 6,009,714 A | * | 1/2000 | Tanaka et al. ................. 62/141 |
| 6,038,882 A | * | 3/2000 | Kuroda et al. ................. 62/476 |
| 6,047,559 A | * | 4/2000 | Tanaka et al. ................. 62/476 |
| 6,116,047 A | * | 9/2000 | Inoue et al. ................... 62/476 |

FOREIGN PATENT DOCUMENTS

| JP | 57-20543 | 4/1982 |
| JP | 11-304274 | 11/1999 |

* cited by examiner

*Primary Examiner*—Sang Y. Paik
*Assistant Examiner*—Malik N. Drake
(74) *Attorney, Agent, or Firm*—Westerman, Hattori, Daniels & Adrian, LLP

(57) ABSTRACT

An absorption cold or hot water generating machine is driven by a high-temperature exhaust gas discharged from an external apparatus such as a gas turbine. The absorption cold or hot water generating machine includes an exhaust gas path for introducing a high-temperature exhaust gas serving as a heat source into a high-temperature generator, and then an exhaust heat recovery generator. A low-temperature generator comprises a liquid film-type generator in which solution is sprayed on a heat transfer tube bank, and refrigerant vapor generated in the exhaust heat recovery generator is led to a heat transfer tube bank of the low-temperature generator.

29 Claims, 17 Drawing Sheets

ABSORPTION COLD OR HOT WATER GENERATING MACHINE

BACKGROUND OF THE INVENTION

1. Field of the Invention

The present invention relates to an absorption cold or hot water generating machine, and more particularly to an absorption cold or hot water generating machine which is driven by an exhaust gas, can effectively utilize a high-temperature exhaust gas discharged from an external apparatus such as a gas turbine to increase exhaust heat utilization efficiency, and can be compact.

2. Description of the Related Art

In the case where an absorption cold or hot water generating machine is driven by a high-temperature exhaust gas having a temperature of about 200 to 400, when the absorption cold or hot water generating machine is operated for air cooling, it is known that the high-temperature exhaust gas is utilized in double effect, and is utilized in single effect when the temperature of the exhaust gas is lowered, thus increasing exhaust heat utilization efficiency. Such absorption cold or hot water generating machine has been proposed in Japanese patent publication No. 57-20543, Japanese laid-open patent publication No. 11-304274, and the like.

However, in the above conventional absorption cold or hot water generating machine, the circulation flow of absorption solution imposes restrictions on an arrangement of constituent equipment, and an exhaust gas path for allowing an exhaust gas serving as a heat source of a generator to pass therethrough and an absorption solution piping for allowing absorption solution to pass therethrough are complicated, and hence it is difficult for the absorption cold or hot water generating machine to be compact.

Further, in the above conventional absorption cold or hot water generating machine, because the absorption solution piping is extended in a complicated manner, and an exhaust heat recovery generator and a low-temperature generator have the same pressure, a pump must be separately provided or a potential head must be utilized to feed absorption solution. In the case of utilizing the potential head, the arrangement of constituent equipment is limited by a positional relationship, i.e. height relationship.

In order to construct the absorption cold or hot water generating machine into a compact unit, it is necessary to arrange the position of the upper surface of the exhaust heat recovery generator at a height equal to or lower than the height of a low-temperature shell or casing comprising an absorber, an evaporator, a low-temperature generator and a condenser.

In the absorption cold or hot water generating machine disclosed in the Japanese laid-open patent publication No. 11-304274, an exhaust heat recovery generator is provided at a position higher than a low-temperature shell comprising an absorber, an evaporator, a low-temperature generator and a condenser to facilitate circulation of solution. However, such absorption cold or hot water generating machine has a disadvantage that the absorption cold or hot water generating machine has a large height and is not compact.

Further, in the absorption cold or hot water generating machine disclosed in the Japanese laid-open patent publication No. 11-304274, it is necessary to provide a pump separately to feed absorption solution from an exhaust heat recovery generator or a low-temperature generator to a high-temperature generator having a higher pressure.

The specific volume of the high-temperature exhaust gas serving as a heat source is very large, and a volume flow rate of the high-temperature exhaust gas becomes large. In the case where the high-temperature exhaust gas is led at a large volume flow rate to the high-temperature generator, and then the exhaust heat recovery generator, a large installation volume is required to provide an exhaust gas path depending on the manner in which the exhaust heat recovery generator is arranged.

In the absorption cold or hot water generating machine disclosed in the Japanese patent publication No. 57-20543, if an exhaust gas path is extended in a complicated manner, it is difficult to make the absorption cold or hot water generating machine compact.

Further, gas-liquid separation in the exhaust heat recovery generator generally requires a large volume, and hence the dimension of a gas-liquid separator becomes a bar to provide the exhaust gas path.

SUMMARY OF THE INVENTION

The present invention has been made in view of the above drawbacks in the prior art, and it is therefore a first object of the present invention to provide an absorption cold or hot water generating machine which is driven by an exhaust gas, can effectively utilize a high-temperature exhaust gas by a simple apparatus structure, and has a high thermal efficiency.

A second object of the present invention is to provide an absorption cold or hot water generating machine which is driven by an exhaust gas, and can be compact in an overall structure by improving connecting relationship of constituent equipment within a cycle.

In order to achieve the first object, according to a first aspect of the present invention, there is provided an absorption cold or hot water generating machine comprising: an absorber; a low-temperature generator; an exhaust heat recovery generator; a high-temperature generator; a condenser; an evaporator; a solution path and a refrigerant path for connecting the absorber, the low-temperature generator, the exhaust heat recovery generator, the high-temperature generator, the condenser, and the evaporator; and an exhaust gas path for introducing a high-temperature exhaust gas serving as a heat source into the high-temperature generator, and then the exhaust heat recovery generator; wherein the low-temperature generator comprises a liquid film-type generator in which solution is sprayed on a heat transfer tube bank, and the refrigerant vapor generated in the exhaust heat recovery generator is led to the heat transfer tube bank of the low-temperature generator.

In the absorption cold or hot water generating machine, the absorption solution heated and concentrated in the low-temperature generator by the refrigerant vapor supplied from the high-temperature generator should be led to the exhaust heat recovery generator. Further, in the exhaust gas path of the high-temperature exhaust gas in the high-temperature generator, a burner for combusting fuel supplied from the outside should be provided to cope with the shortage of cold or hot water capacity.

In the absorption cold or hot water generating machine which utilizes the high-temperature exhaust gas, in order to utilize the quantity of heat of the exhaust gas as much as possible as a heat source of the high-temperature generator for thereby increasing thermal efficiency, it is necessary to lower the temperature in the high-temperature generator.

According to the present invention, in order to lower the condensation temperature of the refrigerant vapor supplied from the high-temperature generator for thereby lowering the boiling temperature in the high-temperature generator, the heat transfer of the low-temperature generator is improved for thereby lowering the boiling temperature.

The low-temperature generator comprises a liquid film-type generator for spraying solution on the heat transfer tube bank to increase the heat transfer, and the rise of boiling pressure and boiling temperature which may be caused by the liquid level in the case of a flooded-type generator can be prevented.

Further, a condenser may be provided for each of the low-temperature generator and the exhaust heat recovery generator. However, in the present invention, a single condenser is used for both the low-temperature generator and the exhaust heat recovery generator to make an overall apparatus compact. Further, the refrigerant vapor (in some cases refrigerant vapor contains droplets of solution) is led to the tube bank of the low-temperature generator, and both of the low-temperature generator and the exhaust heat recovery generator share gas-liquid separation to make the overall apparatus compact and reduce the cost of the apparatus.

Further, solution having a lower concentration than solution in the exhaust heat recovery generator is introduced into the low-temperature generator, and is then led to the exhaust heat recovery generator. Specifically, the concentration of solution in the low-temperature generator is lowered to reduce the boiling temperature, and the condensation temperature of the refrigerant vapor supplied from the high-temperature generator and serving as a heat source is lowered. Incidentally, if the quantity of exhaust heat is small, the quantity of heat may be supplemented by a burner or the like.

The absorption cold or hot water generating machine may further comprise a combustion device provided in the exhaust gas path for combusting fuel supplied from the outside. The combustion device may comprise a burner.

The absorption solution heated and concentrated by the refrigerant vapor supplied from the high-temperature generator in the low-temperature generator may be led to the exhaust heat recovery generator.

The solution path may include a path for allowing a diluted solution flowing from the absorber to be branched and to flow to the high-temperature generator and the exhaust heat recovery generator, and a path for allowing the solution heated and concentrated in the high-temperature generator to flow from the high-temperature generator to the low-temperature generator.

The solution path may include a path for allowing a diluted solution flowing from the absorber to be branched and to flow to the low-temperature generator and the exhaust heat recovery generator via a low-temperature heat exchanger, and to the high-temperature generator via a high-temperature heat exchanger.

The solution path may include a path for allowing a diluted solution flowing from the absorber to be branched and to flow to the high-temperature generator and the low-temperature generator, and a path for allowing the solution heated and concentrated in the high-temperature generator to flow from the high-temperature generator to the exhaust heat recovery generator.

Further, in order to achieve the second object, the high-temperature generator and the exhaust heat recovery generator are arranged along a straight line in a flow direction of the exhaust gas. The direction of the straight line is parallel to a longitudinal direction of the shell comprising the absorber, the evaporator, the condenser and the low-temperature generator, and hence it is possible to arrange an exhaust gas path in a compact manner (see FIGS. 13 and 14).

In order to achieve the first and second objects, according to a second aspect of the present invention, there is provided an absorption cold or hot water generating machine comprising: an absorber; a low-temperature generator; an exhaust heat recovery generator; a high-temperature generator; a condenser; an evaporator; a solution path and a refrigerant path for connecting the absorber, the low-temperature generator, the exhaust heat recovery generator, the high-temperature generator, the condenser, and the evaporator; and an exhaust gas path for introducing a high-temperature exhaust gas serving as a heat source into the high-temperature generator, and then the exhaust heat recovery generator; wherein the solution path includes a path for allowing a diluted solution flowing from the absorber to be branched and to flow to the high-temperature generator and the exhaust heat recovery generator, and a path for allowing the diluted solution heated and concentrated to an intermediate concentration by the high-temperature exhaust gas in the high-temperature generator to flow from the high-temperature generator to the low-temperature generator; and wherein the solution having the intermediate concentration led to the low-temperature generator is heated by refrigerant vapor generated in the high-temperature generator and serving as a heat source and is concentrated, and the diluted solution led to the exhaust heat recovery generator is heated and concentrated by the exhaust gas which has passed through the high-temperature generator.

The low-temperature generator may comprise a liquid film-type generator in which solution is sprayed on the heat transfer tube bank, and the refrigerant vapor generated in the exhaust heat recovery generator is led to the heat transfer tube bank of the low-temperature generator.

The absorption cold or hot water generating machine may further comprise a combustion device provided in the exhaust gas path for allowing the high-temperature exhaust gas to pass therethrough, and the combustion device is adapted to combust fuel supplied from the outside.

Because the exhaust heat recovery generator is provided to perform heat recovery further from the exhaust gas from which heat recovery has been performed in the high-temperature generator, the capacity of the cold or hot water generating machine can be increased. Because the high-temperature generator and the exhaust heat recovery generator which utilize the same heat source (exhaust gas) are connected in series in the exhaust gas path, the exhaust gas duct whose extension is difficult due to large specific volume can be prevented from being extended in a complicated manner. Thus, the overall structure of the apparatus can be compact.

The connection of the absorption solution piping employs such a flow that absorption solution flows smoothly in accordance with the pressure of the cycle. Specifically, the absorption solution flows from the high-temperature generator having a high pressure to the low-temperature generator, and then the absorber having a low pressure, thus performing double effect.

In order to utilize the quantity of heat of the exhaust gas as much as possible as a heat source of the exhaust heat recovery generator for thereby increasing thermal efficiency, it is necessary to lower the temperature of the exhaust gas at the outlet of the exhaust heat recovery generator. In the present invention, the absorption solution having a low concentration is introduced into the exhaust heat recovery generator to lower a boiling temperature of the solution. With this arrangement, the temperature of the exhaust gas at the outlet can be lowered and the quantity of heat of the exhaust gas obtained in the exhaust heat recovery generator can be increased.

The refrigerant vapor generated in the exhaust heat recovery generator is led to the vapor phase side of the low-temperature generator having a lower pressure, and joins the refrigerant vapor having a low pressure and generated in the low-temperature generator, and then the combined refrigerant vapor is led to the condenser where the refrigerant vapor is condensed by heat exchange with cooling water. A single condenser may be sufficient.

Further, in order to increase heat transfer in the low-temperature generator for thereby reducing the amount of absorption solution to be reserved, a liquid film-type generator is employed and a head of the solution pump can be utilized to spray absorption solution on the heat transfer tube bank in the low-temperature generator.

In order to achieve the first and second objects, according to a third aspect of the present invention, there is provided an absorption cold or hot water generating machine comprising: an absorber; a low-temperature generator; an exhaust heat recovery generator; a high-temperature generator; a condenser; an evaporator; a solution path and a refrigerant path for connecting the absorber, the low-temperature generator, the exhaust heat recovery generator, the high-temperature generator, the condenser, and the evaporator; and an exhaust gas path for introducing a high-temperature exhaust gas serving as a heat source into the high-temperature generator, and then the exhaust heat recovery generator; wherein the solution path includes a path for allowing absorption solution flowing from the absorber to be branched and to flow to the low-temperature generator and the exhaust heat recovery generator via a low-temperature heat exchanger, and to the high-temperature generator via a high-temperature heat exchanger; and wherein the absorption solution led to the high-temperature generator is heated and concentrated by the high-temperature exhaust gas, the absorption solution led to the exhaust heat recovery generator is heated and concentrated by the exhaust gas which has passed through the high-temperature generator, and the absorption solution led to the low-temperature generator is heated and concentrated by refrigerant vapor generated in the high-temperature generator.

The low-temperature generator may comprise a liquid film-type generator in which solution is sprayed on the heat transfer tube bank, and refrigerant vapor generated in the exhaust heat recovery generator is led to the heat transfer tube bank of the low-temperature generator.

The absorption cold or hot water generating machine may further comprise a combustion device provided in the exhaust gas path for allowing the high-temperature exhaust gas to pass therethrough, and the combustion device is adapted to combust fuel supplied from the outside.

In the absorption cold or hot water generating machine, the high-temperature generator and the exhaust heat recovery generator which utilize the same heat source (exhaust gas) are connected in series in the exhaust gas path to construct an exhaust gas generator, and hence an extension of the exhaust gas duct can be simplified.

According to the present invention, absorption liquid is supplied separately to the high-temperature generator, the exhaust heat recovery generator and the low-temperature generator, and hence it is possible to solve the above problems.

Further, in order to increase heat transfer in the low-temperature generator for thereby reducing the amount of absorption solution to be reserved, a liquid film-type generator is greatly employed. In the absorption cold or hot water generating machine according to the present invention, a head of the solution pump can be utilized to spray absorption solution on the heat transfer tube bank in the low-temperature generator.

In order to increase the quantity of heat of the exhaust gas utilized as a heat source in the high-temperature generator for thereby increasing the thermal efficiency, it is necessary to lower the temperature in the high-temperature generator.

In the absorption cold or hot water generating machine according to the present invention, absorption solution having a low concentration is introduced into the low-temperature generator, and the condensation temperature of the refrigerant vapor supplied from the high-temperature generator is lowered, and hence the temperature in the high-temperature generator can be lowered.

In order to achieve the first and second objects, according to another aspect in the third aspect of the present invention, there is provided an absorption cold or hot water generating machine comprising: an absorber; a low-temperature generator; an exhaust heat recovery generator; a high-temperature generator; a condenser; an evaporator; a solution path and a refrigerant path for connecting the absorber, the low-temperature generator, the exhaust heat recovery generator, the high-temperature generator, the condenser, and the evaporator; and an exhaust gas path for introducing a high-temperature exhaust gas serving as a heat source into the high-temperature generator, and then the exhaust heat recovery generator; wherein the solution path includes a path for allowing absorption solution flowing from the absorber to be divided into three parts and to be led to the high-temperature generator, the exhaust heat recovery generator, and the low-temperature generator; and wherein the total flow rate of the absorption solution led to the high-temperature generator, the exhaust heat recovery generator, and the low-temperature generator is distributed such that 45 to 70% of the total flow rate of the absorption solution is distributed to the low-temperature generator, and the remaining absorption solution is distributed to the high-temperature generator and the exhaust heat recovery generator at a ratio determined by a temperature of the exhaust gas to be supplied thereto.

The remaining absorption solution may be distributed such that when the temperature of the exhaust gas to be supplied thereto is Tgas, the ratio of the absorption solution led to the high-temperature generator is $\{Tgas-(150\sim185)\}/\{Tgas-(90\sim120)\}$ within 10 to 90% of the remaining absorption solution.

The exhaust gas flowing through the exhaust heat recovery generator and the absorption solution may be heated and concentrated by the exhaust gas flow in a countercurrent flow.

The exhaust gas flowing through the high-temperature generator and the absorption solution may be heated and concentrated by the exhaust gas flow in a countercurrent flow.

The absorption cold or hot water generating machine may further comprise a high-temperature generator for supplemental combustion.

In order to achieve the first and second objects, according to a fourth aspect of the present invention, there is provided an absorption cold and hot water generating machine comprising: an absorber; a low-temperature generator; an exhaust heat recovery generator; a high-temperature generator; a condenser; an evaporator; a solution path and a refrigerant path for connecting the absorber, the low-temperature generator, the exhaust heat recovery generator, the high-temperature generator, the condenser, and the evaporator; and an exhaust gas path for introducing a high-temperature exhaust gas serving as a heat source into the high-temperature generator, and then the exhaust heat recovery generator; wherein the solution path includes a path for allowing absorption solution flowing from the absorber to be branched and to flow to the high-temperature generator and the low-temperature generator; and wherein the absorption solution led to the high-temperature generator is heated and concentrated by the high-temperature exhaust gas, the heated and concentrated absorption solution is led to the exhaust heat recovery generator and is heated and concentrated by the exhaust gas which has passed through the high-temperature generator, and the absorption solution led to the low-temperature generator is heated and concentrated by refrigerant vapor generated in the high-temperature generator.

The low-temperature generator may comprise a liquid film-type generator in which solution is sprayed on the heat transfer tube bank, and the refrigerant vapor generated in the exhaust heat recovery generator is led to the heat transfer tube bank of the low-temperature generator.

The absorption cold or hot water generating machine may further comprise a combustion device provided in the exhaust gas path for allowing the high-temperature exhaust gas to pass therethrough, and the combustion device is adapted to combust fuel supplied from the outside. Further, a heat recovery device for recovering heat from the exhaust gas may be provide between the high-temperature generator and the exhaust heat recovery generator, and downstream of the exhaust heat recovery generator in the heating path (exhaust gas path) for allowing the high-temperature exhaust gas to pass therethrough.

In order to achieve the first and second objects, according to a fifth aspect of the present invention, there is provided an absorption cold or hot water generating machine comprising: an absorber; a low-temperature generator; an exhaust heat recovery generator; a high-temperature generator; a condenser; an evaporator; a solution path and a refrigerant path for connecting the absorber, the low-temperature generator, the exhaust heat recovery generator, the high-temperature generator, the condenser, and the evaporator; and an exhaust gas path for introducing a high-temperature exhaust gas serving as a heat source into the high-temperature generator, and then the exhaust heat recovery generator; wherein the high-temperature generator and the exhaust heat recovery generator are connected along a substantially straight line in a flow direction of the exhaust gas, and the flow direction of the exhaust gas is parallel to a longitudinal direction of a shell comprising the absorber, the evaporator, the condenser, and the low-temperature generator.

The low-temperature generator may comprise a liquid film-type generator in which solution is sprayed on a heat transfer tube bank, and the refrigerant vapor generated in the exhaust heat recovery generator is led to the heat transfer tube bank of the low-temperature generator.

The absorption cold or hot water generating machine may further comprise a combustion device provided in the exhaust gas path for combusting fuel supplied from the outside. The combustion device may comprise a burner.

The absorption solution heated and concentrated by the refrigerant vapor supplied from the high-temperature generator in the low-temperature generator may be led to the exhaust heat recovery generator.

The solution path may include a path for allowing a diluted solution flowing from the absorber to be branched and to flow to the high-temperature generator and the exhaust heat recovery generator, and a path for allowing the solution heated and concentrated in the high-temperature generator to flow from the high-temperature generator to the low-temperature generator.

The solution path may include a path for allowing a diluted solution flowing from the absorber to be branched and to flow to the low-temperature generator and the exhaust heat recovery generator via a low-temperature heat exchanger, and to the high-temperature generator via a high-temperature heat exchanger.

The solution path may include a path for allowing a diluted solution flowing from the absorber to be branched and to flow to the high-temperature generator and the low-temperature generator, and a path for allowing the solution heated and concentrated in the high-temperature generator to flow from the high-temperature generator to the exhaust heat recovery generator.

The above and other objects, features, and advantages of the present invention will be apparent from the following description when taken in conjunction with the accompanying drawings which illustrates preferred embodiments of the present invention by way of example.

DETAILED DESCRIPTION OF THE PREFERRED EMBODIMENTS

Figure 1A:
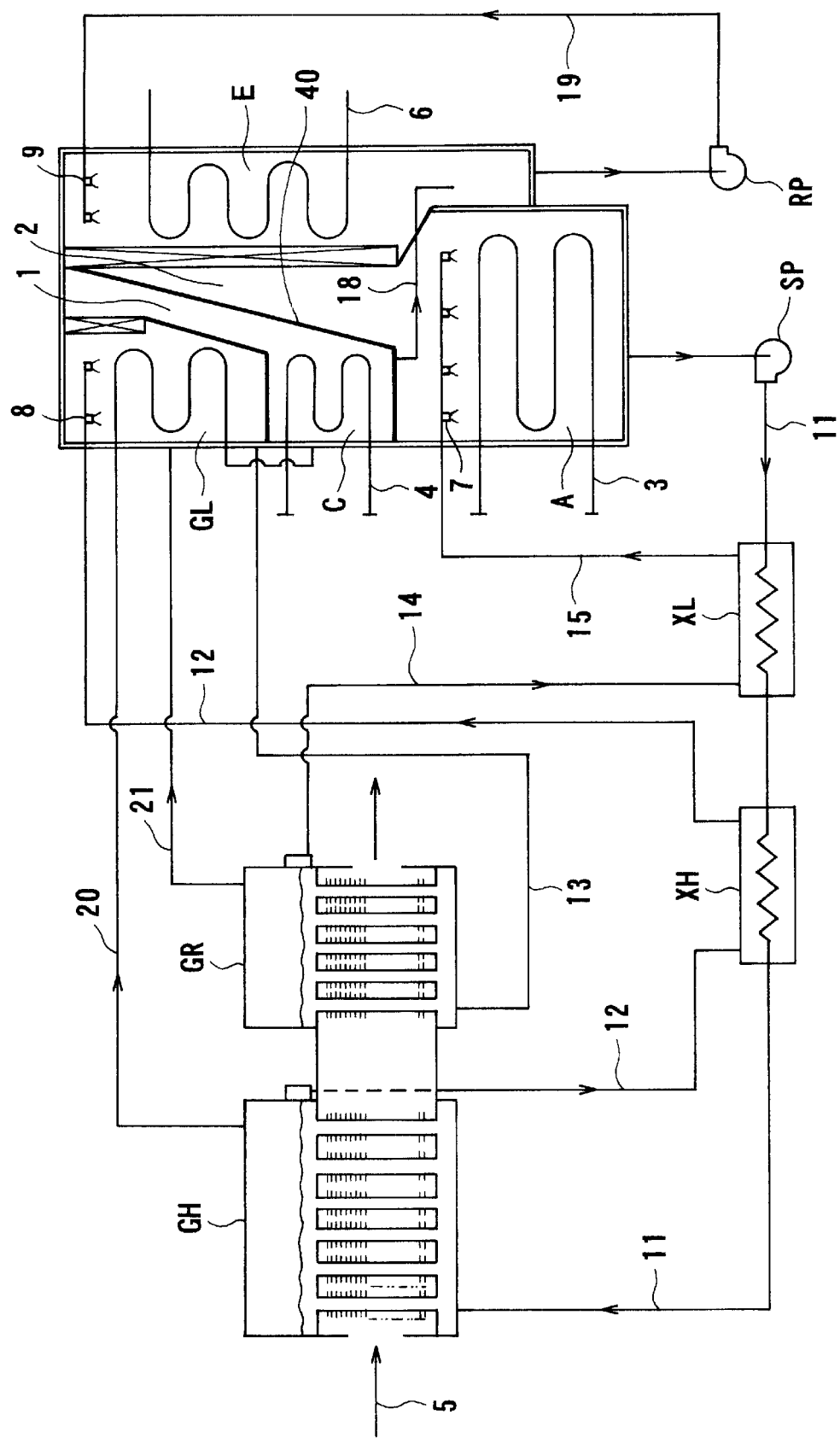
FIG. 1A is a schematic circuit diagram of an absorption cold or hot water generating machine according to an embodiment of a first aspect of the present invention.

An absorption cold or hot water generating machine according to embodiments of the present invention will be described below with reference to drawings. In FIGS. 1A through 14, like or corresponding parts are denoted by like or corresponding reference numerals or characters throughout views.

Next, an absorption cold or hot water generating machine according to embodiments of a first aspect of the present invention will be described in detail with reference to FIGS. 1A through 4.

As working medium of the absorption cold or hot water generating machine, water is generally used as refrigerant, and an aqueous solution of inorganic salts such as an aqueous solution of lithium bromide is generally used as absorption solution. In the following embodiments, the same working medium is used.

In the absorption cold or hot water generating machine shown in FIGS. 1A through 4, there are provided an absorber A, a low-temperature generator GL, a high-temperature generator GH, an exhaust heat recovery generator GR, a condenser C, an evaporator E, a low-temperature heat exchanger XL, a high-temperature heat exchanger XH, and exhaust heat recovery heat exchangers XA and XB. Further, in the absorption cold or hot water generating machine, there are provided a solution pump SP, and a refrigerant pump RP.

In FIGS. 1A through 4, reference numerals 1 and 2 represent refrigerant vapor passage, reference numerals 3 and 4 represent cooling water passages, reference numeral 5 represents a high-temperature exhaust gas, and reference numeral 6 represents a cold or hot water passage. Further, reference numeral 7 represents a concentrated solution spray pipe, reference numeral 8 represents a solution spray pipe of the low-temperature generator GL, and reference numeral 9 represents a refrigerant liquid spray pipe. Furthermore, reference numerals 11 through 16 represent solution passages, and reference numerals 18 through 21 represent refrigerant passages.

As shown in FIGS. 1A through 4, in the present invention, the absorber A, the evaporator E, the low-temperature generator GL, and the condenser C are housed in a single rectangular shell. The absorber A is disposed in the lower part of the shell, and the evaporator E is disposed in the upper part of the shell and located in an obliquely upward direction of the absorber A. The condenser C is disposed above the absorber A, and the low-temperature generator GL is disposed above the condenser C. The low pressure side of the absorber A and the evaporator E, and the high pressure side of the low-temperature generator GL and the condenser C are separated by an obliquely extending partition wall 40, and the passage 1 is defined above the partition wall 40 to allow refrigerant vapor to flow from the low-temperature generator GL to the condenser C and the passage 2 is defined below the partition wall 40 to allow refrigerant vapor to flow from the evaporator E to the absorber A.

Further, the high-temperature generator GH and the exhaust heat recovery generator GR which utilize the high-temperature exhaust gas 5 as a heat source, and the solution heat exchangers XH and XL are provided discretely from the shell. The absorber A and the low-temperature generator GL in the shell, the high-temperature generator GH, and the exhaust heat recovery generator GR are connected to each other by the solution passages 11 through 16, and the refrigerant passages 20 and 21.

Next, the absorption cold or hot water generating machine shown in FIG. 1A will be described in detail. FIG. 1A shows an example of a series flow in which absorption solution is circulated through the absorber A, the high-temperature generator GH, the low-temperature generator GL, the exhaust heat recovery generator GR, and the absorber A.

In a cooling operation of the absorption cold or hot water generating machine shown in FIG. 1A, the diluted solution which has absorbed refrigerant is supplied by the solution pump SP from the absorber A through the passage 11, the side to be heated of the low-temperature heat exchanger XL, the side to be heated of the high-temperature heat exchanger XH to the high-temperature generator GH. In the high-temperature generator GH, the diluted solution is heated by the high-temperature exhaust gas 5 serving as a heat source to generate refrigerant and is concentrated, and the concentrated solution flows through the passage 12 into the high-temperature heat exchanger XH in which heat exchange is carried out, and is then introduced into the low-temperature generator GL. The solution introduced into the low-temperature generator GL is heated by the refrigerant vapor supplied from the high-temperature generator GH and is concentrated in the low-temperature generator GL, and is then introduced into the exhaust heat recovery generator GR through the passage 13. Thereafter, in the exhaust heat recovery generator GR, the solution is heated by the high-temperature exhaust gas which has been used as a heat source in the high-temperature generator GH, and is concentrated. The concentrated solution passes through the passage 14 and the side to be heated of the low-temperature heat exchanger XL, and is then introduced through the passage 15 into the absorber A. On the other hand, the refrigerant vapor generated in the exhaust heat recovery generator GR passes through the passage 21, and is then introduced into a heat transfer tube bank of the low-temperature generator GL.

With this arrangement, the concentration of absorption solution in the low-temperature generator GL is lowered, and hence the condensation temperature of the refrigerant vapor supplied from the high-temperature generator GH can be lowered and the thermal efficiency of the high-temperature generator GH which utilizes the high-temperature exhaust gas can be increased. The refrigerant gas generated in the high-temperature generator GH passes through the refrigerant passage 20, and is utilized as a heat source of the low-temperature generator GL and then introduced into the condenser C and cooled by cooling water. In the condenser C, the refrigerant gas supplied from the low-temperature generator GL through the passage 1 is cooled by cooling water and is condensed. Then, the condensed refrigerant is supplied through the passage 18 to the evaporator E. In the evaporator E, the refrigerant is circulated through the passage 19 by the refrigerant pump RP and is evaporated, whereby cold water of the load side is deprived of heat of evaporation for thereby being cooled, and the cooled cold water is utilized for air cooling. The evaporated refrigerant is absorbed by the concentrated solution in the absorber A to become a diluted solution, and the diluted solution is circulated by the solution pump SP.

Figure 1B:
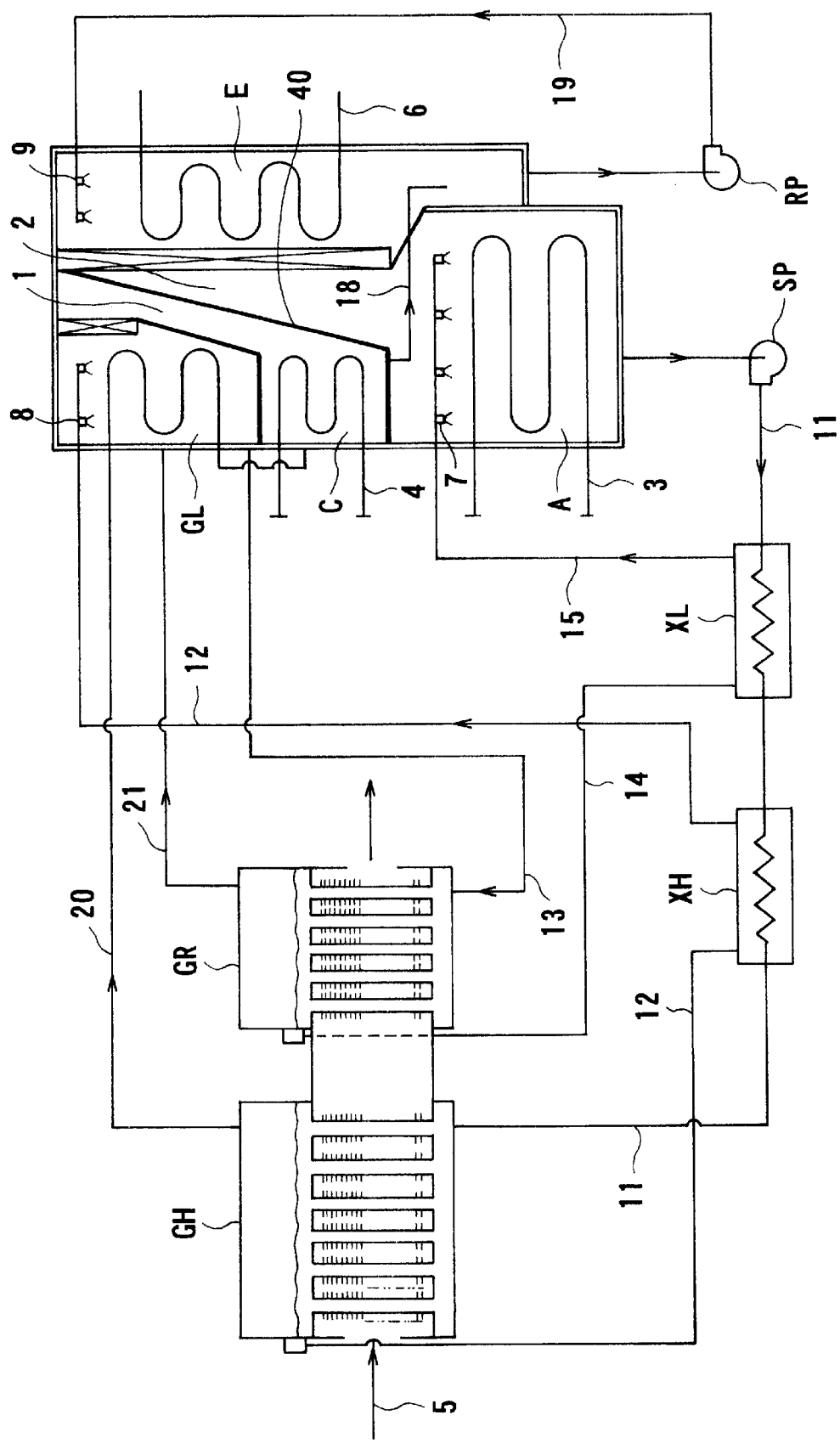
FIG. 1B is a schematic circuit diagram of an absorption cold or hot water generating machine according to a modified embodiment of FIG. 1A.

FIG. 1B shows a modified embodiment of FIG. 1A. In the embodiment shown in FIG. 1B, in the high-temperature generator GH and the exhaust heat recovery generator GR, the high-temperature exhaust gas and the solution flow in a countercurrent flow, and hence utilization efficiency of heat of the high-temperature exhaust gas is further increased compared with the embodiment shown in FIG. 1A.

Figure 2A:
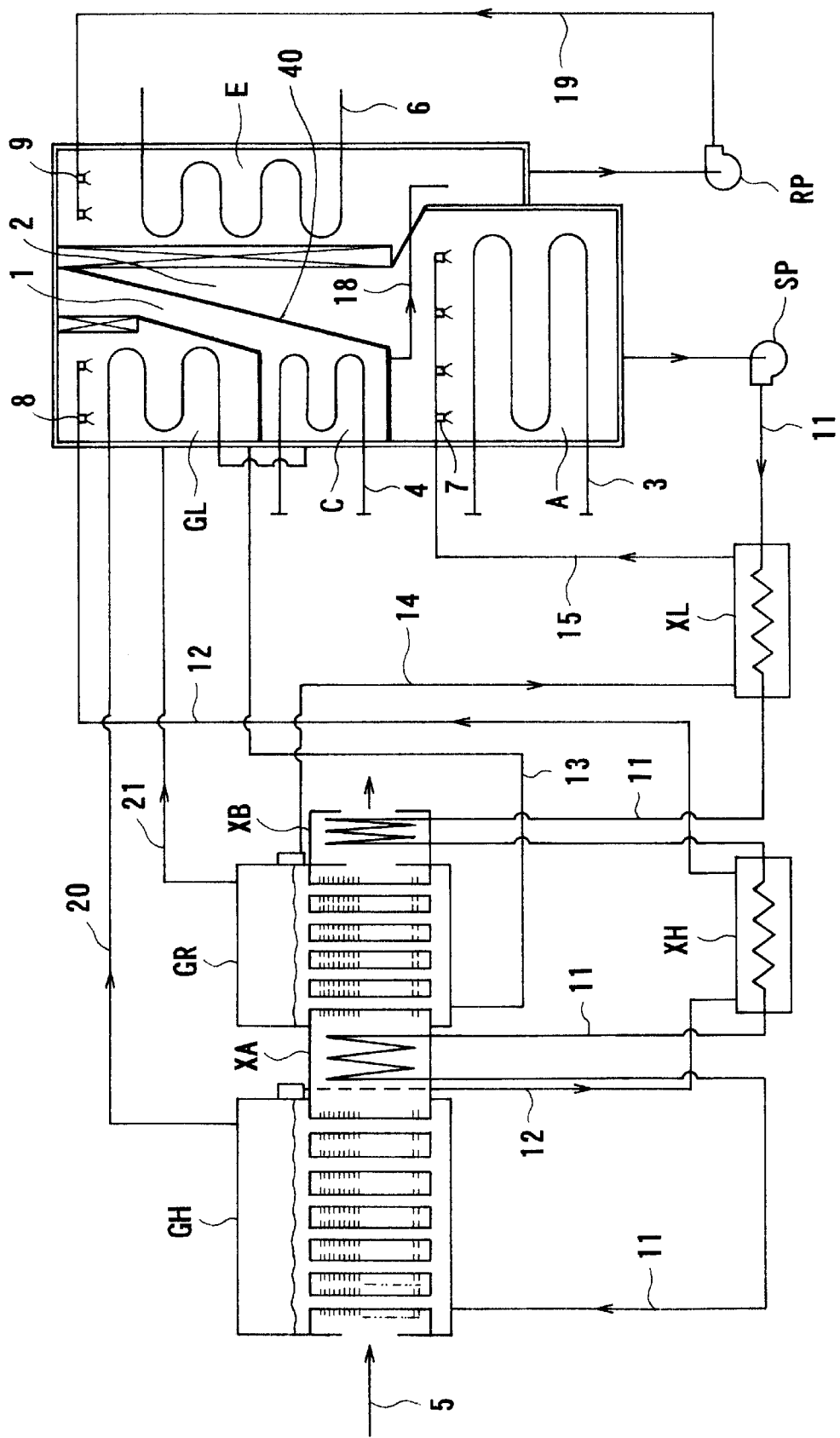
FIG. 2A is a schematic circuit diagram of an absorption cold or hot water generating machine according to another embodiment of the first aspect of the present invention.

In the embodiment shown in FIG. 2A, the exhaust heat recovery heat exchanger XA for heating solution to be introduced into the high-temperature generator GH is provided downstream of the high-temperature generator GH in the flow path of the high-temperature exhaust gas, and the exhaust heat recovery heat exchanger XB for heating solution to be introduced into the high-temperature heat exchanger XH is provided downstream of the exhaust heat recovery generator GR in the flow path of the high-temperature exhaust gas. With this arrangement, the utilization efficiency of heat possessed by the high-temperature exhaust gas 5 is further increased compared with the embodiments shown in FIGS. 1A and 1B.

Figure 2B:
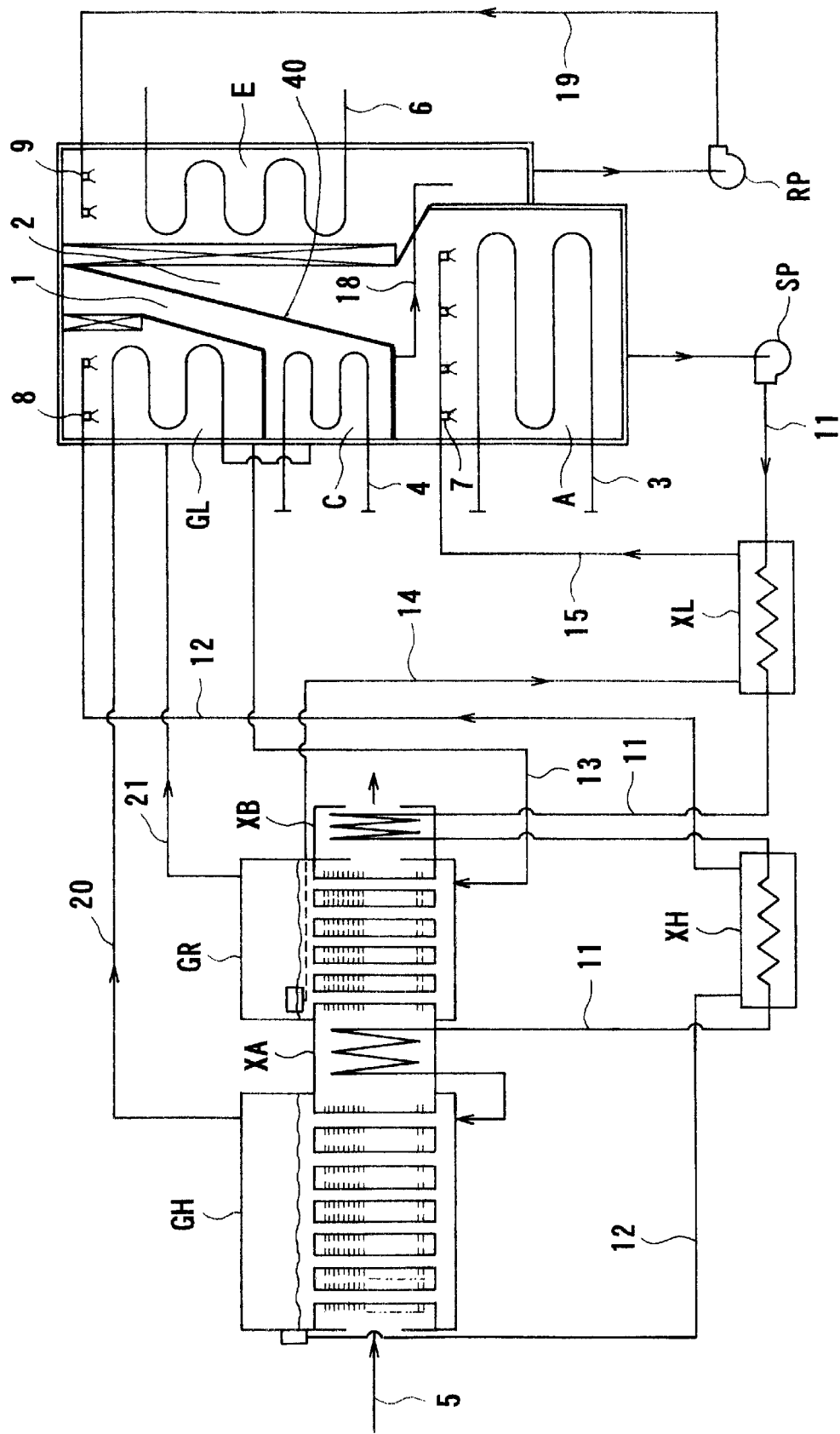
FIG. 2B is a schematic circuit diagram of an absorption cold or hot water generating machine according to a modified embodiment of FIG. 2A.

FIG. 2B shows a modified embodiment of FIG. 2A. In the embodiment shown in FIG. 2B, in the high-temperature generator GH and the exhaust heat recovery generator GR, the high-temperature exhaust gas and the solution flow in a countercurrent flow, and hence utilization efficiency of heat of the high-temperature exhaust gas is further increased compared with the embodiment shown in FIG. 2A.

Figure 3:
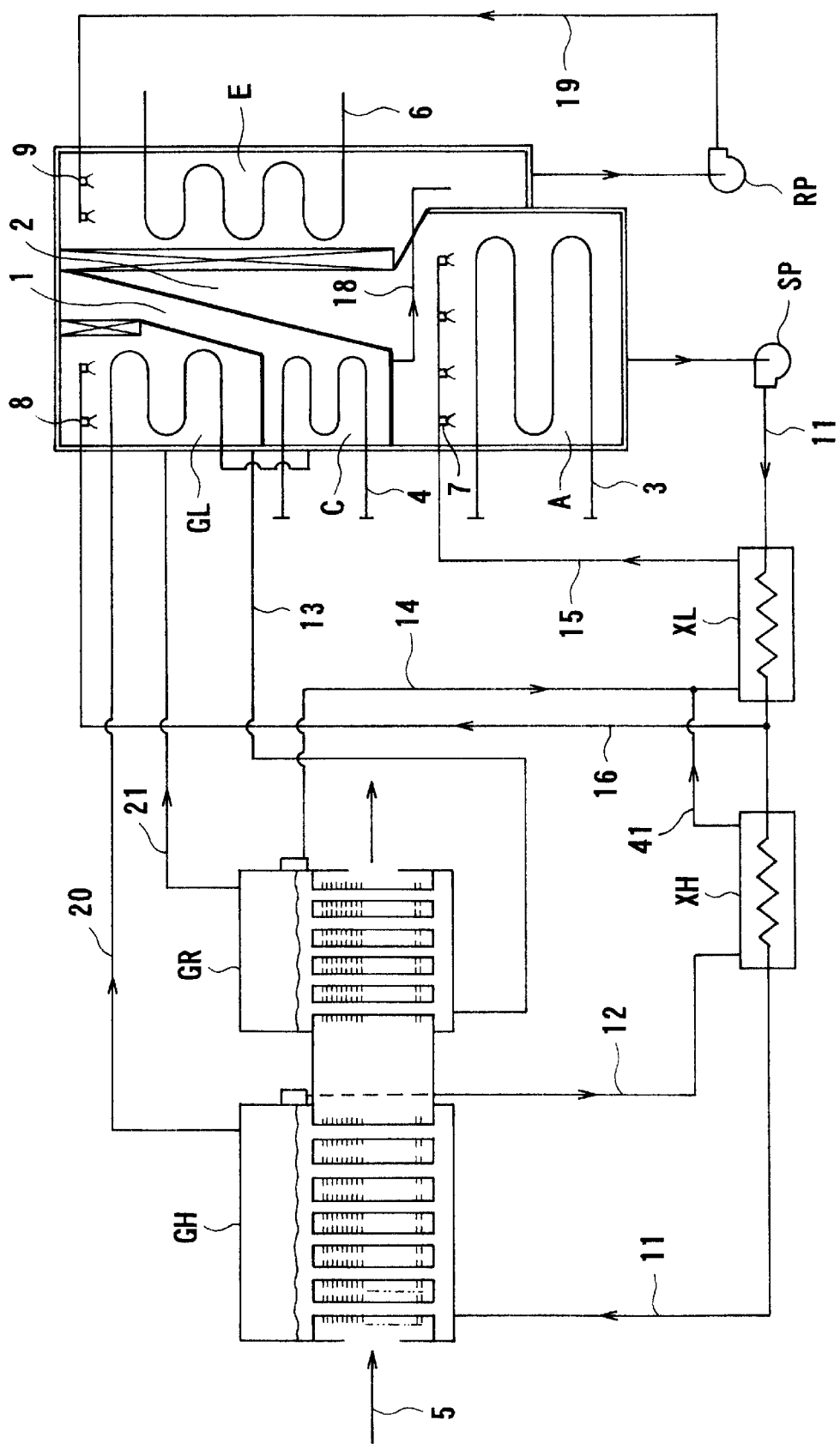
FIG. 3 is a schematic circuit diagram of an absorption cold or hot water generating machine according to still another embodiment of the first aspect of the present invention.

In the embodiment shown in FIG. 3, the diluted solution is supplied from the absorber A to the side to be heated of the low-temperature heat exchanger XL and is discharged from the low-temperature heat exchanger XL, and is then branched from the passage 11 and introduced into the low-temperature generator GL through the passage 16. Specifically, in the embodiment shown in FIG. 3, the solution path comprises a path for allowing the diluted solution to flow from the absorber A to the high-temperature generator GH through the passage 11, the side to be heated of the low-temperature heat exchanger XL and the side to be heated of the high-temperature heat exchanger XH, a path for allowing the concentrated solution to flow from the passage 12 through the heating side of the high-temperature heat exchanger XH to the passage 41 connected to the concentrated solution passage 14 extending from the exhaust heat recovery generator GR to the low-temperature heat exchanger XL, a path including the passage 16 branched from the passage 11 at the position downstream of the side to be heated of the low-temperature heat exchanger XL and extending to the low-temperature generator GL, the passage 13 for allowing the concentrated solution to flow from the low-temperature generator GL to the exhaust heat recovery generator GR, the passage 14 for allowing the concentrated solution which has further concentrated in the exhaust heat recovery generator GR to flow from the exhaust heat recovery generator GR, join the concentrated solution flowing from the high-temperature generator GH through the passages 12 and 41 and then flow into the heating side of the low-temperature heat exchanger XL, and the passage 15 for allowing the concentrated solution to flow from the low-temperature heat exchanger XL to the absorber A. The operation of the absorption cold or hot water generating machine in FIG. 3 is the same as that in FIG. 1.

In the embodiment shown in FIG. 3, in the high-temperature generator GH and the exhaust heat recovery generator GR, the high-temperature exhaust gas and the solution flow in a parallel current flow. However, it is desirable that the high-temperature exhaust gas and the solution flow in a countercurrent flow as with the embodiment shown in FIG. 1B.

Figure 4:
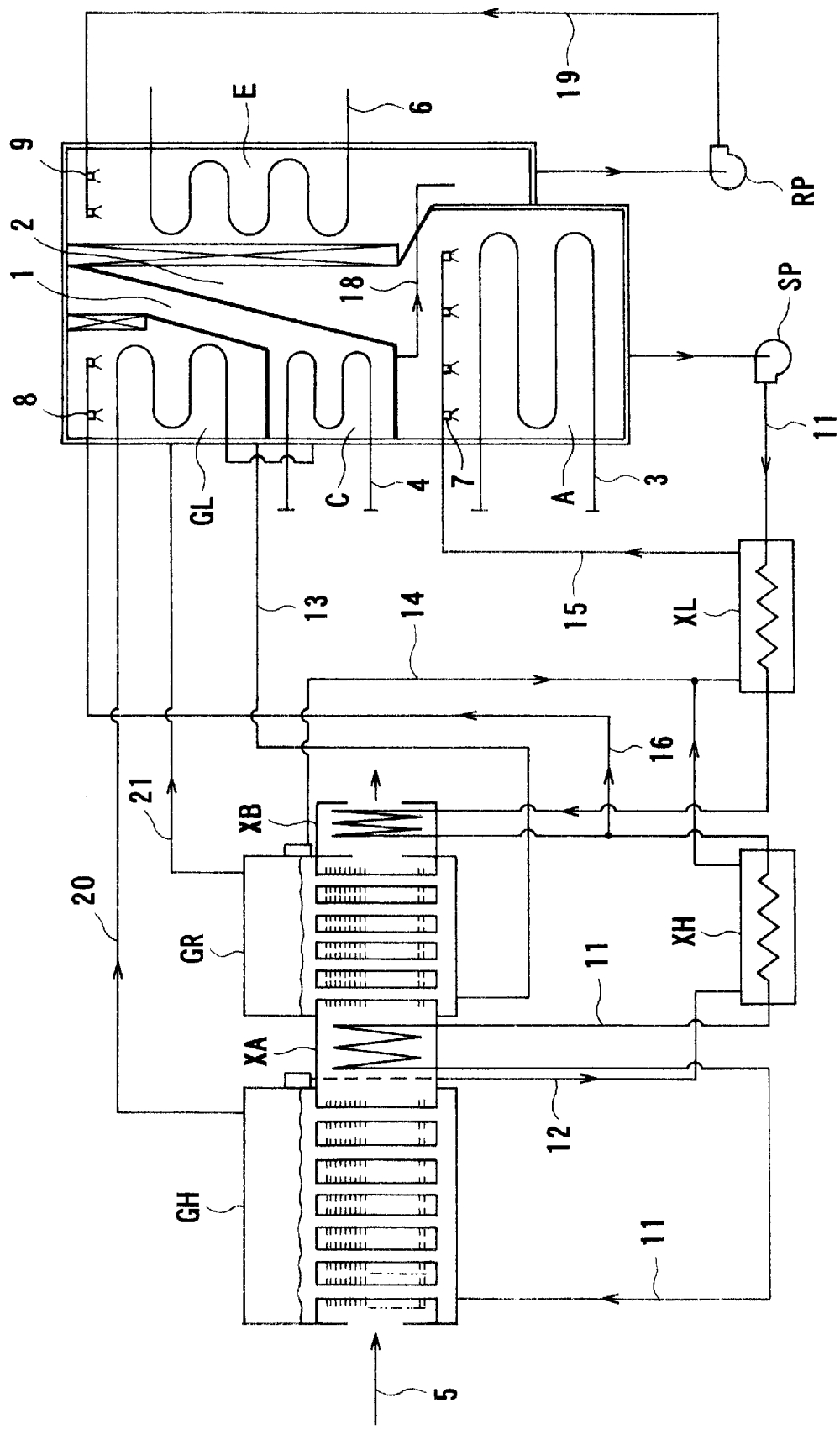
FIG. 4 is a schematic circuit diagram of an absorption cold or hot water generating machine according to still another embodiment of the first aspect of the present invention.

In the embodiment shown in FIG. 4, the exhaust heat recovery heat exchangers XA and XB which are identical to those in FIG. 2 are provided in the flow path of the high-temperature exhaust gas, and hence are added to the absorption cold or hot water generating machine shown in FIG. 3. The operation and effect of the FIG. 4 embodiment is the same as that of the FIG. 2 embodiment.

Figure 5:
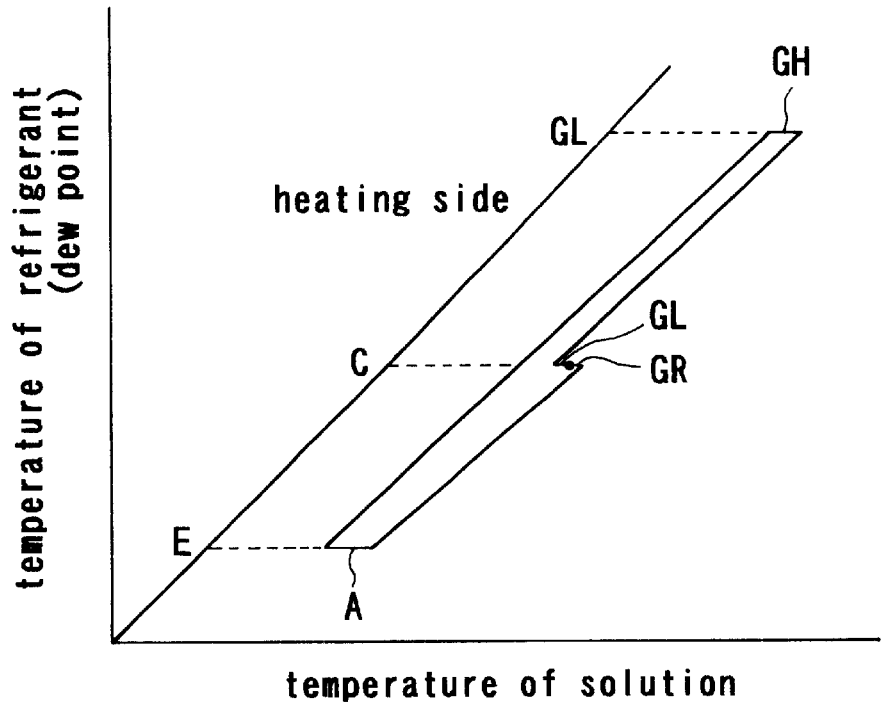
FIG. 5 is an absorption refrigeration cycle diagram of the absorption cold or hot water generating machine shown in FIG. 1A.
Figure 6:
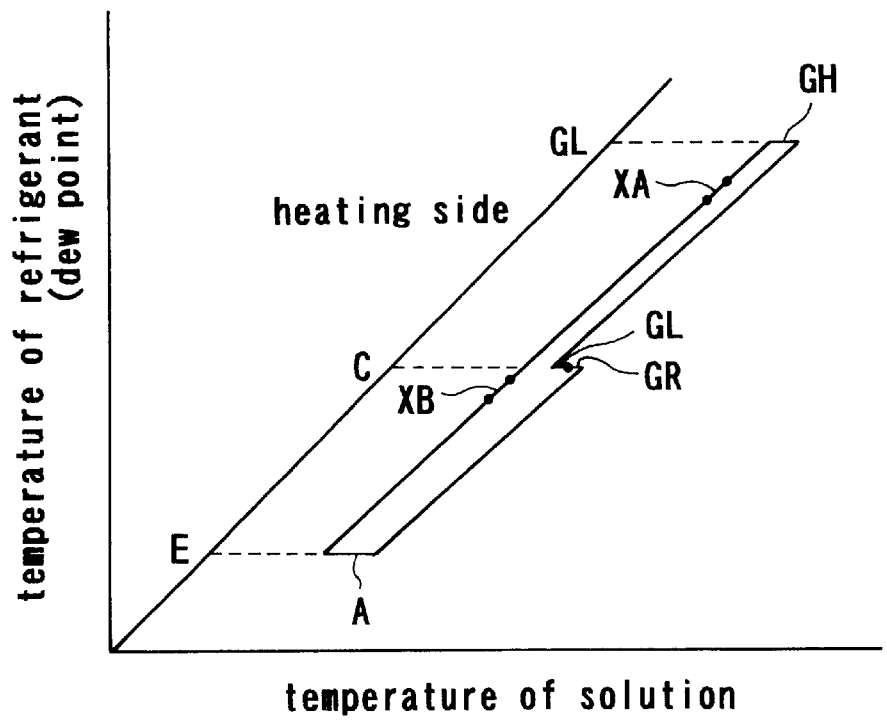
FIG. 6 is an absorption refrigeration cycle diagram of the absorption cold or hot water generating machine shown in FIG. 2A.
Figure 7:
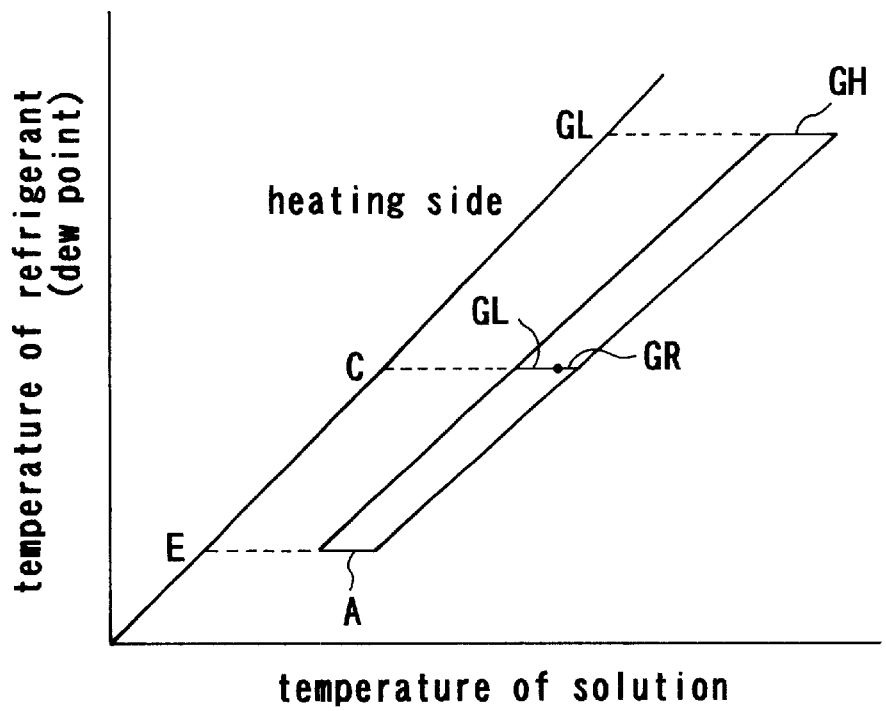
FIG. 7 is an absorption refrigerating cycle diagram of the absorption cold or hot water generating machine shown in FIG. 3.
Figure 8:
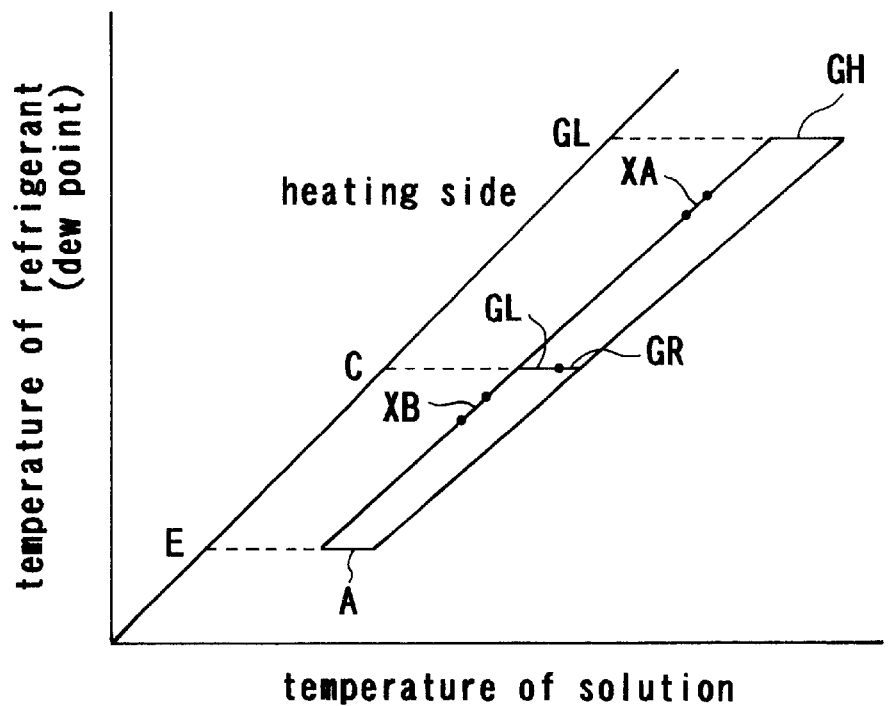
FIG. 8 is an absorption refrigerating cycle diagram of the absorption cold or hot water generating machine shown in FIG. 4.

FIGS. 5 through 8 are diagrams showing cycles of the absorption cold or hot water generating machines shown in FIGS. 1 through 4. In FIGS. 5 through 8, the horizontal axis represents a temperature of solution, and the vertical axis represents a temperature of refrigerant (saturation temperature of refrigerant vapor). In FIGS. 5 through 8, the cycles are illustrated on the Dühring Diagram. FIG. 5 shows an absorption refrigeration cycle in the absorption cold or hot water generating machine shown in FIG. 1, FIG. 6 shows an absorption refrigeration cycle in the absorption cold or hot water generating machine shown in FIG. 2, FIG. 7 shows an absorption refrigeration cycle in the absorption cold or hot water generating machine shown in FIG. 3, and FIG. 8 shows an absorption refrigeration cycle in the absorption cold or hot water generating machine shown in FIG. 4.

According to the present invention, the exhaust heat recovery generator utilizing the exhaust gas, as a heat source, which has been used as a heat source of the high-temperature generator is provided in the flow path of the high-temperature exhaust gas so that the exhaust gas is utilized until the exhaust gas is cooled to a low temperature. Further, the low-temperature generator comprises a liquid film-type generator in which solution is sprayed on the heat transfer tube bank, and hence the condensation temperature of refrigerant vapor from the high-temperature generator is lowered, and the amount of the exhaust gas to be utilized in the high-temperature generator for double effect is increased. Furthermore, the refrigerant vapor of the exhaust heat recovery generator is led to the tube bank of the low-temperature generator to perform gas-liquid separation for both of the low-temperature generator and the exhaust heat recovery generator, thus making it possible to provide the absorption cold or hot water generating machine having a compact structure and a high efficiency.

Figure 9:
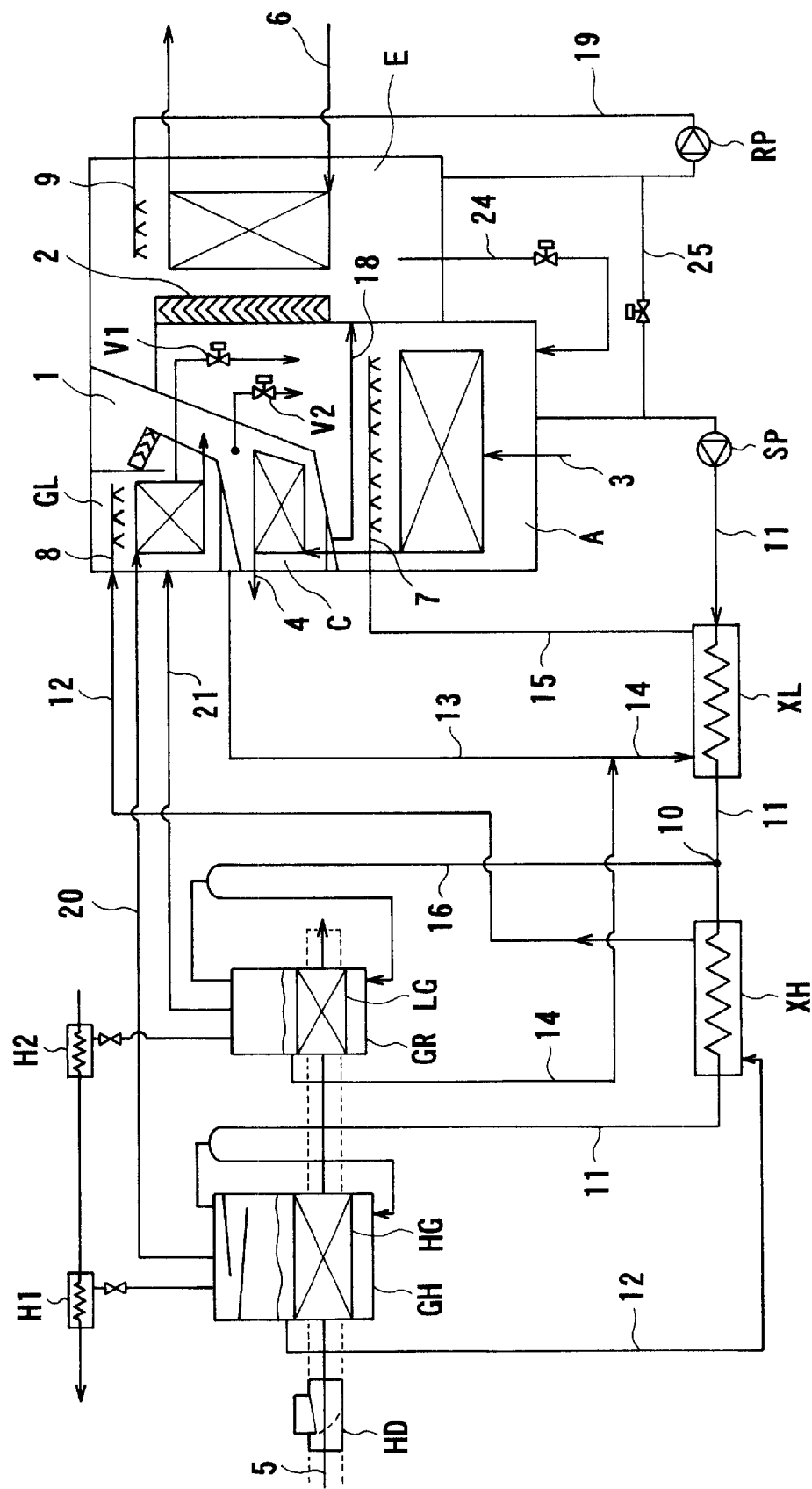
FIG. 9 is a schematic circuit diagram of an absorption cold or hot water generating machine according to an embodiment of a second aspect of the present invention.

Next, an absorption cold or hot water generating machine according to an embodiment of the second aspect of the present invention will be described with reference to FIG. 9. FIG. 9 is a schematic circuit diagram of an absorption cold or hot water generating machine according to the embodiment of the second aspect of the present invention. In the absorption cold or hot water generating machine shown in FIG. 9, there are provided an absorber A, a low-temperature generator GL, a high-temperature generator GH, an exhaust heat recovery generator GR, a condenser C, an evaporator E, a low-temperature heat exchanger XL, and a high-temperature heat exchanger XH. Further, in the absorption cold or hot water generating machine, there are provided a solution pump SP, and a refrigerant pump RP. An exhaust gas damper HD is provided in the flow path of the high-temperature exhaust gas.

In FIG. 9, reference characters HG and LG represent vertical heat transfer tube banks, reference characters H1 and H2 represent hot water supply heat exchangers, and reference characters V1 and V2 represent vapor valves. Reference numerals 1 and 2 represent refrigerant vapor passages, reference numerals 3 and 4 represent cooling water circulation passages, reference numeral 5 represents high-temperature exhaust gas, and reference numeral 6 represents a cold or hot water circulation passage. Further, reference numerals 7, 8 and 9 represent spray pipes, the reference numeral 10 represents a branch point, reference numerals 11 through 16 represent solution passages, and reference numerals 18 through 25 represent refrigerant passages.

Next, operations of the absorption cold or hot water generating machine shown in FIG. 9 will be described.

First, in the cold water producing operation, the solution which has absorbed refrigerant is supplied by the solution pump SP from the absorber A to the side to be heated of the low-temperature heat exchanger XL through the passage 11, and then passes through the low-temperature heat exchanger XL and is branched at the branch point 10. Then, a part of the solution passes through the side to be heated of the high-temperature heat exchanger XH, and is led to the high-temperature generator GH through the passage 11. In the high-temperature generator GH, the solution is heated by the exhaust gas 5 discharged from an external gas turbine or the like and serving as a heat source to generate refrigerant and is thus concentrated up to an intermediate concentration. Then, the intermediate concentration solution passes through the passage 12 and is introduced into the high-temperature heat exchanger XH. After heat exchange is performed in the high-temperature heat exchanger XH, the intermediate concentration solution is introduced into the low-temperature generator GL through the passage 12.

The intermediate concentration solution which has been introduced into the low-temperature generator GL is further heated by the refrigerant vapor generated in the high-temperature generator GH and serving as a heat source and is concentrated, and then flows through the passage 13 and joins the solution flowing through the passage 14. The remaining solution branched at the branch point 10 passes through the passage 16 and is introduced into the exhaust heat recovery generator GR. In the exhaust heat recovery generator GR, the solution is heated by the exhaust gas discharged from the high-temperature generator GH and is concentrated. Then, the concentrated solution passes through the passage 14 and joins the solution concentrated by the low-temperature generator GL and flowing through the passage 13. The combined solution passes through the heating side of the low-temperature heat exchanger XL and the passage 15 and is introduced into the absorber A.

On the other hand, the refrigerant vapor generated in the high-temperature generator GH passes through the passage 20 and is introduced into the low-temperature generator GL, and is condensed in the heat transfer tube bank at the heating side of the low-temperature generator GL and led to the condenser C. The refrigerant vapor generated in the exhaust heat recovery generator GR passes through the passage 21, and joins the refrigerant vapor generated in the low-temperature generator GL, and then the combined refrigerant vapor passes through the vapor passage 1 and flows into the condenser C. In the condenser C, the refrigerant vapor is condensed by heat exchange with cooling water flowing through the cooling water circulation passage 4, and the condensed refrigerant is led to the evaporator E through the passage 18. The cold water flowing through the cold water circulation passage 6 is deprived of latent heat of evaporation of refrigerant in the evaporator E, thus making it possible to produce cold water.

Next, the hot water producing operation will be described below. In the hot water producing operation, circulation of the cooling water is stopped and the vapor valves V1 and V2 are opened. Thus, the refrigerant vapor generated in the high-temperature generator GH, the low-temperature generator GL and the exhaust heat recovery generator GR is led to the evaporator E to produce hot water. The refrigerant liquid condensed in the evaporator E is led to the absorber A through the refrigerant passage 24.

Further, according to the present invention, a two shell structure comprising an exhaust gas heat recovery shell (high-temperature shell) which combines the high-temperature generator and the exhaust heat recovery generator into a single unit, and a low-temperature shell which comprises the absorber, the evaporator, the low-temperature generator and the condenser can be constructed to allow the overall apparatus to be compact.

If the refrigerating capacity is insufficient, a burner is provided in the high-temperature generator, and a supplemental combustion can be also carried out by supplying fuel to the burner for thereby increasing the quantity of heat of the driving heat source. While operation of the absorption cold or hot water generating machine is stopped, the exhaust gas damper HD provided at the inlet side of the high-temperature generator GH in the flow path of the exhaust gas is switched to discharge the exhaust gas to the outside of the system.

According to the present invention, the high-temperature generator and the exhaust heat recovery generator are connected in series in the exhaust gas path, and the absorption solution path is constructed such that the absorption solution is branched and introduced into the high-temperature generator and the exhaust heat recovery generator, respectively. With this arrangement, the exhaust gas duct can be prevented from being extended in a complicated manner, and hence the overall structure of the absorption cold or hot water generating machine driven by the exhaust gas can be compact.

Next, an absorption cold or hot water generating machine according to an embodiment of a third aspect of the present invention will be described with reference to FIGS. 10A through 10E.

Figure 10A:
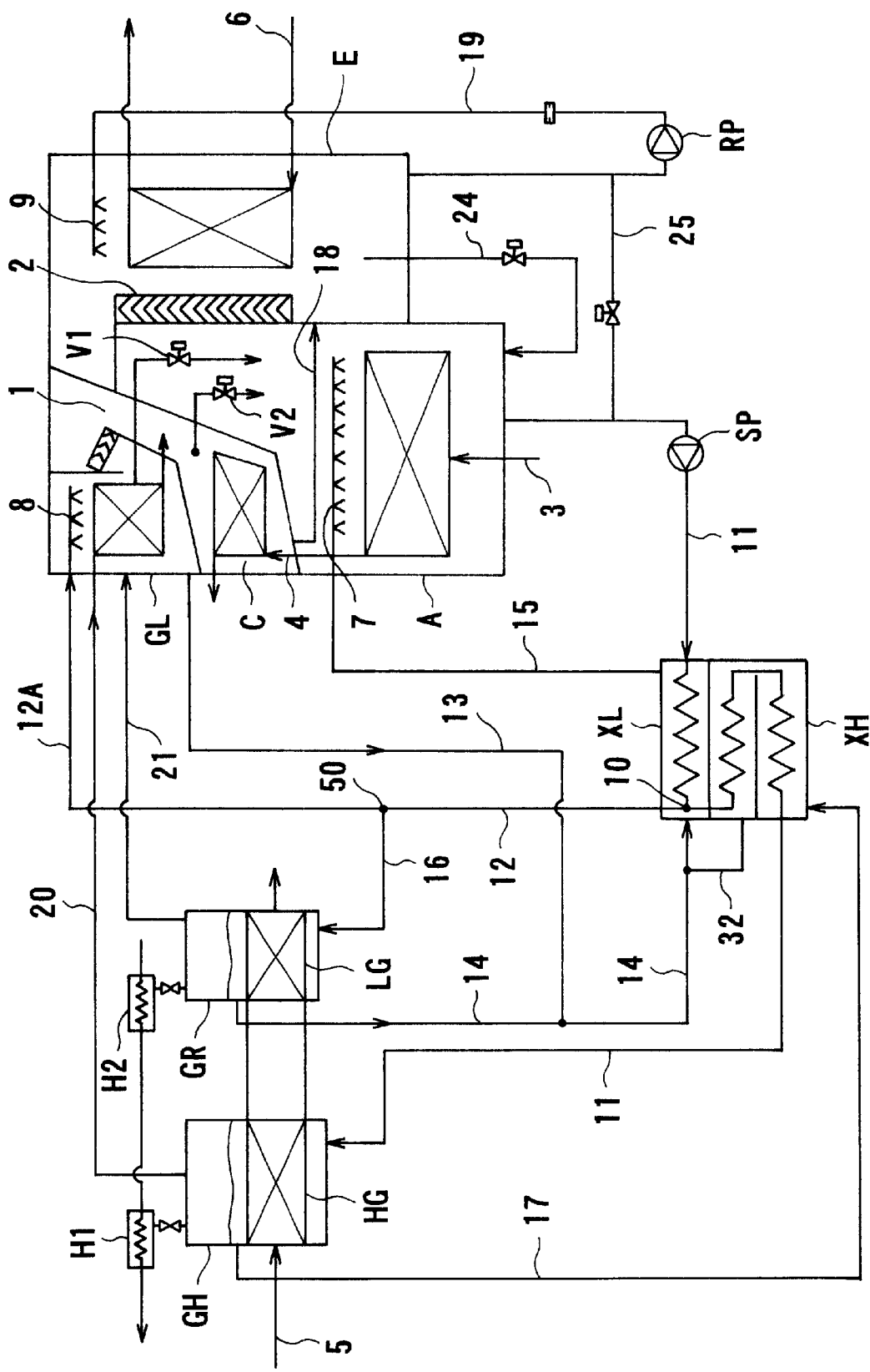
FIG. 10A is a schematic circuit diagram of an absorption cold or hot water generating machine according to an embodiment of a third aspect of the present invention.

FIG. 10A is a schematic circuit diagram of an absorption cold or hot water generating machine according to the embodiment of the third aspect of the present invention. In the absorption cold or hot water generating machine shown in FIG. 10A, there are provided an absorber A, a low-temperature generator GL, a high-temperature generator GH, an exhaust heat recovery generator GR, a condenser C, an evaporator E, a low-temperature heat exchanger XL, and a high-temperature heat exchanger XH. Further, in the absorption cold or hot water generating machine, there are provided a solution pump SP, and a refrigerant pump RP.

In FIG. 10A, reference characters HG and LG represent vertical heat transfer tube banks, reference characters H1 and H2 represent hot water supply heat exchangers, and reference characters V1 and V2 represent vapor valves. Reference numerals 1 and 2 represent refrigerant vapor passages, reference numerals 3 and 4 represent cooling water circulation passages, reference numeral 5 represents a high-temperature exhaust gas, and reference numeral 6 represents a cold or hot water circulation passage. Further, reference numerals 7, 8 and 9 represent spray pipes, reference numerals 10 and 50 represent branch points, reference numerals 11 through 17 represent solution passages, and reference numerals 18 through 25 represent refrigerant passages.

Next, operations of the absorption cold or hot water generating machine shown in FIG. 10A will be described.

First, in the cold water producing operation, the solution which has absorbed refrigerant is supplied by the solution pump SP from the absorber A to the side to be heated of the low-temperature heat exchanger XL through the passage 11, and then passes through the low-temperature heat exchanger XL and is branched at the branch point 10. Then, a part of the solution passes through the side to be heated of the solution heat exchanger XH, and is led to the high-temperature generator GH through the passage 11, and the remaining solution flows through the passage 12 and is branched at the branch point 50 into the passages 12A and 16.

In the high-temperature generator GH, the solution is heated by the exhaust gas 5 discharged from an external gas turbine or the like and serving as a heat source to generate refrigerant and is thus concentrated. The concentrated solution in the high-temperature generator GH passes through the passage 17 and is introduced into the high-temperature heat exchanger XH where heat exchange is performed, and then passes through the passage 32 and joins the solution flowing through the passage 14. The absorption solution branched from the passage 12 into the passage 16 is led to the exhaust heat recovery generator GR, and is then heated by the exhaust gas discharged from the high-temperature generator GH and concentrated in the exhaust heat recovery generator GR.

The absorption solution branched from the passage 12 into the passage 12A is led to the low-temperature generator GL, and is heated by the refrigerant vapor generated in the high-temperature generator GH and is concentrated in the low-temperature generator GL. The concentrated absorption solution is led to the passage 13, and joins the absorption solution concentrated in the exhaust heat recovery generator GR and flowing through the passage 14, and then joins the absorption solution concentrated in the high-temperature generator GH and flowing through the passage 32. Then, the combined absorption solution is introduced into the low-temperature heat exchanger XL where heat exchange of the combined absorption solution is performed, and the absorption solution is then led to the absorber A through the passage 15.

On the other hand, the refrigerant vapor generated in the high-temperature generator GH passes through the passage 20, and is condensed in the heat transfer tube bank at the heating side of the low-temperature generator GL and then led to the condenser C.

The refrigerant vapor generated in the exhaust heat recovery generator GR passes through the passage 21, and joins the refrigerant vapor generated in the low-temperature generator GL, and then the combined refrigerant vapor passes through the vapor passage 1 and flows in the condenser C. In the condenser C, the refrigerant vapor is condensed by heat exchange with cooling water flowing through the cooling water circulation passage 4, and the condensed refrigerant is led to the evaporator E through the passage 18. The cold water flowing through the cold water circulation passage 6 is deprived of latent heat in the evaporator E, thus making it possible to produce cold water.

Next, the hot water producing operation will be described. In the hot water producing operation, circulation of the cooling water is stopped and the vapor valves V1 and V2 are opened. Thus, the refrigerant vapor generated in the high-temperature generator GH, the low-temperature generator GL and the exhaust heat recovery generator GR is led to the evaporator E to produce hot water. The refrigerant liquid condensed in the evaporator E is led to the absorber A through the refrigerant passage 24.

Further, in the absorption cold or hot water generating machine according to the present invention, the hot water supply heat exchangers H1 and H2 which utilize the refrigerant vapor generated in the high-temperature generator GH and the exhaust heat recovery generator GR as a heat source are provided, thus making it possible to perform hot-water supply operation. The hot water supply heat exchanger H1 is connected to the high-temperature generator GH by the refrigerant passage, and the hot water supply heat exchanger H2 is connected to the exhaust heat recovery generator GR by the refrigerant passage.

Next, the cold water or hot water supply operation will be described. If a dew point in the exhaust heat recovery generator GR is higher than the temperature of the hot water to be supplied, the refrigerant vapor is condensed in the hot water supply heat exchanger H2 to heat water to be supplied. The condensed refrigerant liquid is returned to the condenser C to contribute to the refrigerating effect in addition to hot-water supply (not shown). If a dew point in the exhaust heat recovery generator GR is lower than the temperature of the hot water to be supplied, the refrigerant vapor is not condensed in the hot water supply heat exchanger H2 and heat transfer does not occur. Because a dew point in the high-temperature generator GH is sufficiently high and the temperature of the hot water to be supplied increases in the hot water supply heat exchanger H1 when any measure is not taken, it is necessary to control the amount of refrigerant to be condensed. Thus, a control valve (not shown) is provided in a refrigerant path for connecting the high-temperature generator GH and the hot water supply heat exchanger H1 to each other so that the amount of the refrigerant vapor to be introduced into the hot water supply heat exchanger H1 is controlled, and the condensed refrigerant liquid can be also returned to the condenser C.

Further, in the hot water producing operation and the hot-water supply operation, because the hot water has a relatively high-temperature, a dew point in the exhaust heat recovery generator GR can be ensured at a high temperature and heating of hot water can be easily carried out in the hot water supply heat exchanger H2.

Further, according to the present invention, a two shell structure comprising an exhaust gas heat recovery shell (high-temperature shell) which combines the high-temperature generator and the exhaust heat recovery generator into a single unit, and a low-temperature shell which comprises the absorber, the evaporator, the low-temperature generator and the condenser can be constructed to allow the overall apparatus to be compact.

If the refrigerating capacity is insufficient, a combustion can be also carried out by supplying fuel to the burner provided in the high-temperature generator (not shown) for thereby increasing the quantity of heat of the driving heat source.

According to the present invention, the high-temperature generator and the exhaust heat recovery generator are connected in series in the exhaust gas path, and the absorption solution path is constructed such that the absorption solution is branched and introduced into the high-temperature generator and the exhaust heat recovery generator, respectively. With this arrangement, the exhaust gas duct can be prevented from being extended in a complicated manner, and hence the overall structure of the absorption cold or hot water generating machine driven by the exhaust gas can be compact.

Figure 10B:
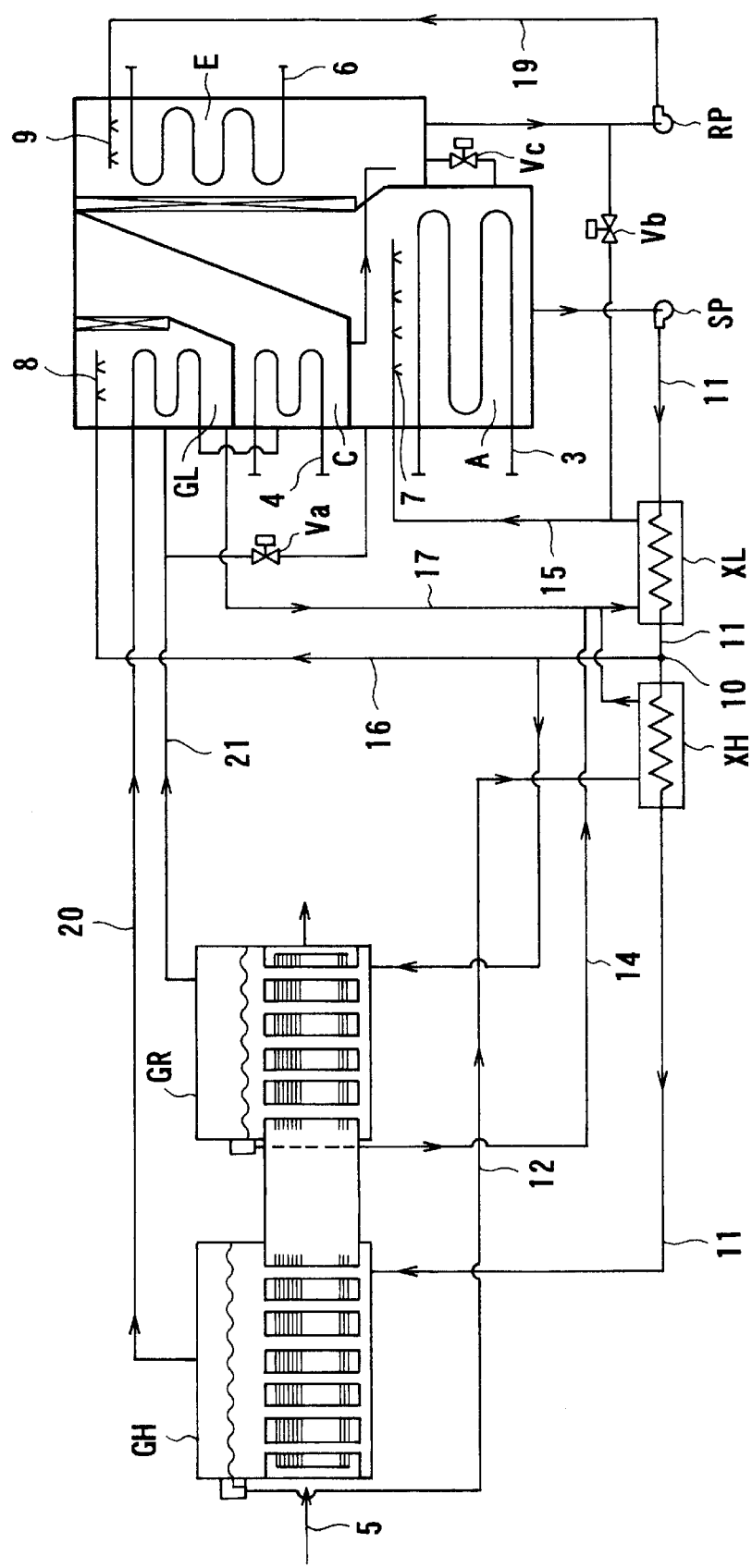
FIG. 10B is a schematic circuit diagram of an absorption cold or hot water generating machine according to a modified embodiment of FIG. 10A.

FIG. 10B shows a modified embodiment of FIG. 10A. In the embodiment shown in FIG. 10B, an exhaust gas 5 discharged from a gas turbine or a gas engine is led to the high-temperature generator GH and then the exhaust heat recovery generator GR for thereby utilizing the exhaust gas as a driving heat source of the absorption cold or hot water generating machine.

Next, operations of the absorption cold or hot water generating machine shown in FIG. 10B will be described.

First, in a cooling operation of the absorption cold or hot water generating machine shown in FIG. 10B, the valves Va, Vb and Vc are closed. The diluted solution from the absorber A is divided into three parts, and a part of the diluted solution is led to the high-temperature generator GH, a part of the diluted solution is led to the exhaust heat recovery generator GR, and the remaining diluted solution is led to the low-temperature generator GL. In the high-temperature generator GH, the exhaust gas serving as a heat source and the absorption solution flow as a whole in a countercurrent flow to perform heat exchange, and the absorption solution is heated and concentrated. In the exhaust gas outlet side of the high-temperature generator GH, heat exchange between the exhaust gas and the diluted solution at the inlet side of the solution is carried out. The exhaust gas which has passed through the high-temperature generator GH is introduced into the exhaust heat recovery generator GR where the exhaust gas and the absorption solution flow as a whole in a countercurrent flow to perform heat exchange, and hence the absorption solution is heated and concentrated. In the exhaust gas outlet side of the exhaust heat recovery generator GR, heat exchange between the exhaust gas and the diluted solution is performed. In the low-temperature generator GL, the absorption solution is heated by the refrigerant vapor generated in the high-temperature generator GH and serving as a heat source and is concentrated. The refrigerant vapor generated in the low-temperature generator GL is introduced together with the refrigerant vapor supplied from the exhaust heat recovery generator GR into the condenser C. In the condenser C, the refrigerant vapor is condensed by heat exchange with cooling water flowing through the cooling water circulation passage 4. The refrigerant vapor which has generated in the high-temperature generator GH and served as a heat source in the low-temperature generator GL becomes a condensed liquid and enters the condenser C, and then the condensed liquid is introduced together with the refrigerant liquid condensed in the condenser C into the evaporator E. In the evaporator E, the refrigerant liquid deprives the cold water of heat to achieve the refrigerating effect, and is turned into the refrigerant vapor. The concentrated solution discharged from the high-temperature generator GH, the exhaust heat recovery generator GR and the low-temperature generator GL is returned to the absorber A, and is sprayed on the heat transfer surface cooled by cooling water to absorb the refrigerant vapor supplied from the evaporator E, thus becoming a diluted solution.

Next, the heating operation will be described below. In the heating operation, the valves Va, Vb and Vc are opened to switch the cooling operation to the heating operation. The cooling water is not flowed.

The diluted solution from the absorber A is divided into three parts, and a part of the diluted solution is led to the high-temperature generator GH, a part of the diluted solution is led to the exhaust heat recovery generator GR, and the remaining diluted solution is led to the low-temperature generator GL. The flow of the absorption solution in which the concentrated solution is led from the generators GH, GR and GL to the heating side of the low-temperature heat exchanger XL is the same as that in the cooling operation. However, in the heating operation, most of the concentrated solution passes through the valve Vb and enters the evaporator E, and is sprayed in the evaporator E.

The refrigerant vapor passes through the valve Va provided in the passage which connects equipment (the low-temperature generator GL, the exhaust heat recovery generator GR and the condenser C) having a pressure level of the low-temperature generator GL to the evaporator E or the absorber A, and is led to the evaporator E. In the evaporator E, the refrigerant vapor is absorbed by the above-mentioned sprayed solution to generate heat of absorption, and hence hot water serving as power in the heating operation is heated by the heat of absorption. The solution which has absorbed the refrigerant vapor in the evaporator E is returned to the absorber A through the valve Vc. Instead of the valve Vc, the solution may be returned to the absorber A through an overflowing pipe (not shown) provided in a liquid storage of the evaporator E.

Figure 10D:
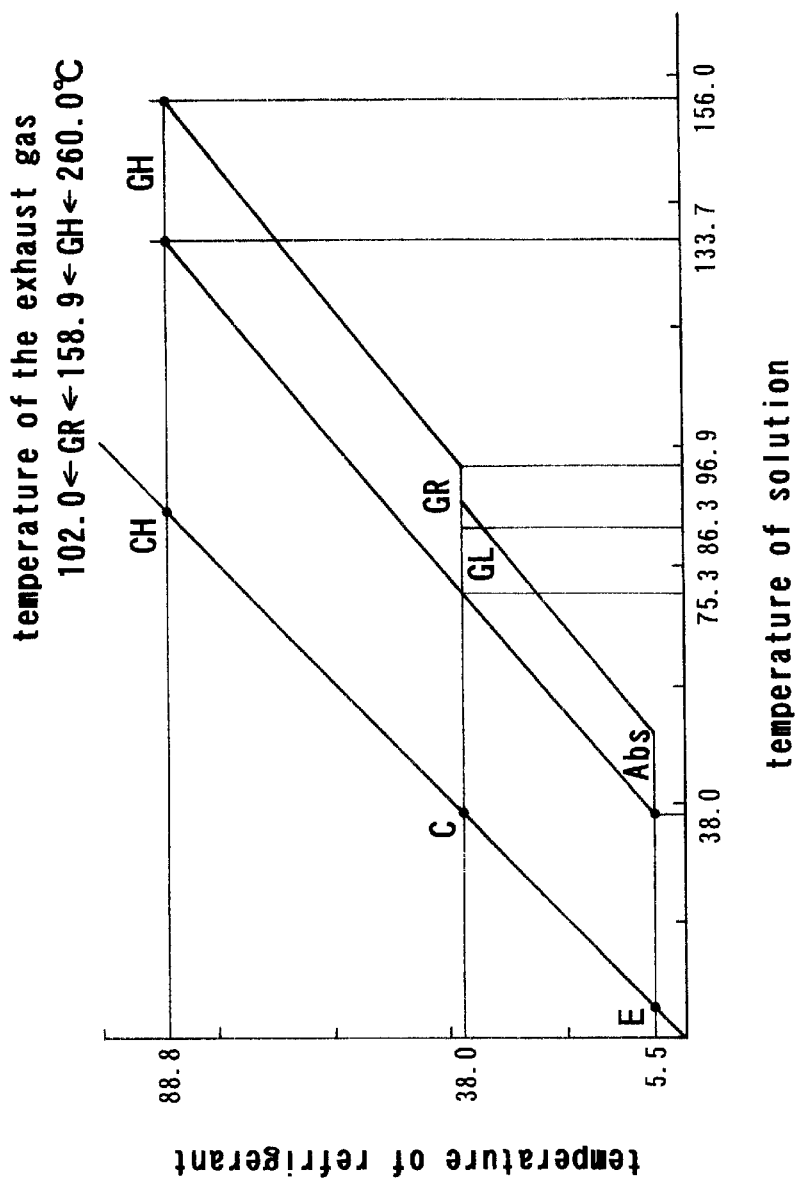
FIG. 10D is an absorption refrigerating cycle diagram assumed by the flow of the solution shown in FIG. 10C.
Figure 10C:
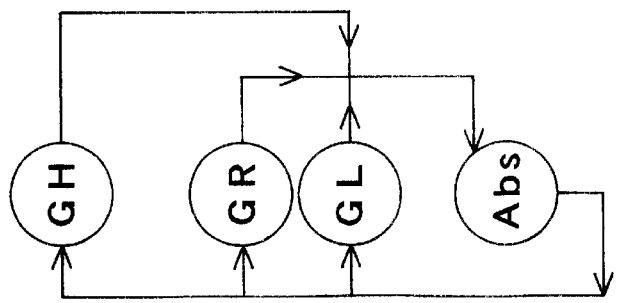
FIG. 10C is a simplified flow diagram showing a flow of the solution in the embodiment shown in FIG. 10B.

FIG. 10C is a simplified flow diagram showing a flow of the solution in the embodiment shown in FIG. 10B, and FIG. 10D is an absorption refrigerating cycle diagram assumed by the flow of the solution shown in FIG. 10C. FIG. 10D further shows a temperature change of the exhaust gas in the case where the absorption cold or hot water generating machine is driven by the exhaust gas having a temperature of 260° C. and discharged from a micro-gas turbine.

The cycle temperature is changed depending on a ratio of distribution of the diluted solution to the high-temperature generator GH, the exhaust heat recovery generator GR and the low-temperature generator GL from the absorber A. In FIG. 10D, the ratio of distribution of the diluted solution is set to 30:20:50.

The cycles are illustrated on the Dühring Diagram. The horizontal axis represents a temperature of solution, and the vertical axis represents a temperature of refrigerant (saturation temperature of refrigerant vapor). The solution is discharged from the absorber Abs at a temperature of 38° C., and is distributed to the low-temperature generator GL, the exhaust heat recovery generator GR and the high-temperature generator GH. In the low-temperature generator GL, boiling begins at a temperature of 75.3° C., and the boiling temperature becomes 86.3° C. at the outlet as the concentration of the solution is increasing. In the low-temperature generator GL, the solution is heated by the refrigerant vapor supplied from the high-temperature generator GH and having a saturation temperature of 88.8° C. In the cycle diagram, the heating side of the low-temperature generator GL serves as a condenser of the refrigerant vapor of the high-temperature generator GH, and hence is represented as a high-temperature condenser CH. In the exhaust heat recovery generator GR, boiling begins at a temperature of 75.3° C., and the boiling temperature becomes 96.9° C. at the outlet as the concentration of the solution is increasing. In the exhaust heat recovery generator GR, the solution is heated by the exhaust gas discharged from the high-temperature generator GH and having a temperature of about 159° C., and thus the exhaust gas is utilized until a temperature of the exhaust gas is lowered to 102° C. at the outlet of the exhaust heat recovery generator GR.

In the high-temperature generator GH, boiling begins at a temperature of 133.7° C., and the boiling temperature becomes 156° C. at the outlet as the concentration of the solution is increasing. In the high-temperature generator GH, the solution is heated by the exhaust gas having a temperature of 260° C., and the exhaust gas is utilized until a temperature of the exhaust gas is lowered to 159° C. at the outlet of the high-temperature generator GH.

The solution discharged from the respective generators is mixed in the vicinity of the outlets of the exhaust heat recovery generator GR and the low-temperature generator GL, and then the mixed solution is returned to the absorber.

Incidentally, the relationship of temperatures shown in FIG. 10D is not fixed and is changed depending on conditions such as heat transfer areas in respective equipment.

A heat source of the low-temperature generator GL is refrigerant vapor, and the solution is heated by latent heat (heat of condensation) at a constant condensation temperature. The temperature (condensation temperature) of the heating source is almost determined by mean temperature of the solution at the outlet and the inlet. It is desirable that the diluted solution in the whole solution to be circulated is introduced into the low-temperature generator GL at a high distribution ratio for thereby lowering the concentration of the solution at the outlet and lowering mean temperature of the solution at the inlet and the outlet. Thus, the condensation temperature (saturation temperature) of the refrigerant vapor in the high-temperature generator GH serving as a heat source of the low-temperature generator GL can be lowered, and the boiling temperature of the solution in the high-temperature generator GH can be lowered from the inlet to the outlet. The flow rate of the solution to the low-temperature generator GL is at least 45% of the total flow rate of the solution from the absorber A, preferably 50% or more of the total flow rate of the solution. On the other hand, the upper limit of the flow rate of the solution is limited by conditions such as crystallization limit in the high-temperature generator GH which utilizes the remaining solution, and should be about 70% of the total flow rate of the solution from a view point of the valance in the cycle.

On the other hand, the exhaust gas serving as a heat source of the high-temperature generator GH and the exhaust heat recovery generator GR changes in sensible heat, and the temperature change of the exhaust gas is several times as high as the change of boiling temperature (temperature of solution) at the outlet and the inlet of the high-temperature generator GH and the change of boiling temperature (temperature of solution) at the outlet and the inlet of the exhaust heat recovery generator GR.

The relationship of the heat exchange of a large sensible heat change is largely affected by a type of the heat exchanger (countercurrent flow, parallel current flow, cross flow), and the countercurrent flow-type heat exchanger is desirable. Besides, at this time, the temperature of the exhaust gas at the outlet is governed by the temperature (boiling temperature) of the solution at the inlet. Therefore, the solution should be supplied to the high-temperature GH or the exhaust heat recovery generator GR such that the diluted solution discharged from the absorber A and having a low concentration and a low boiling temperature is introduced into the high-temperature generator GH or the exhaust heat recovery generator GR in a countercurrent flow against the exhaust gas. The solution to be supplied may be sufficient in a certain small amount.

The amount of the solution to be supplied to the high-temperature generator GH and the exhaust heat recovery generator GR corresponds to the flow rate of the solution determined by subtracting the flow rate of the solution supplied to the low-temperature generator GL from the total flow rate of the solution from the absorber A. If the ratio of the amount of the solution to be supplied to the high-temperature generator GH to the amount of the solution to be supplied to the exhaust heat recovery generator GR is substantially equal to the ratio of the quantity of heat recovered from the exhaust gas in the high-temperature generator GH to the quantity of heat recovered from the exhaust heat recovery generator GR, then the variation range of the concentration of the solution in the high-temperature generator GH is substantially equal to the variation range of the concentration of the solution in the exhaust heat recovery generator GR, thus making the cycle stable.

The temperature of the solution in the high-temperature generator GH is a temperature in the high-temperature generator of double effect, and the temperature of the exhaust gas which can be normally utilized is in the range of about 150 to 185° C. On the other hand, the temperature of the solution in the exhaust heat recovery generator GR corresponds to the temperature of the solution in the generator of single effect, and the temperature of the exhaust gas which can be utilized is in the range of about 90 to 120° C.

When the temperature of the high-temperature exhaust gas to be supplied is Tgas, the ratio of the flow rate of the absorption solution led to the high-temperature generator GH is preferably about $\{Tgas-(150\sim185)\}/\{Tgas-(90\sim120)\}$. In order to ensure the minimum flow rate of the absorption solution led to the high-temperature generator GH and the exhaust heat recovery generator GR, the ratio of the flow rate of the absorption solution led to the high-temperature generator GH is within 10 to 90% of the solution to be supplied to the high-temperature generator GH and the exhaust heat recovery generator GR.

The ratio of distribution of the solution to be supplied to the high-temperature generator GH and the exhaust heat recovery generator GR is determined at a design point, and may not be controlled at other operating points such as partial load. Further, the ratio of distribution of the solution to be supplied to the high-temperature generator GH and the exhaust heat recovery generator GR may be controlled on the basis of the temperature of the exhaust gas introduced into the high-temperature generator GH and the exhaust heat recovery generator GR.

Figure 10E:
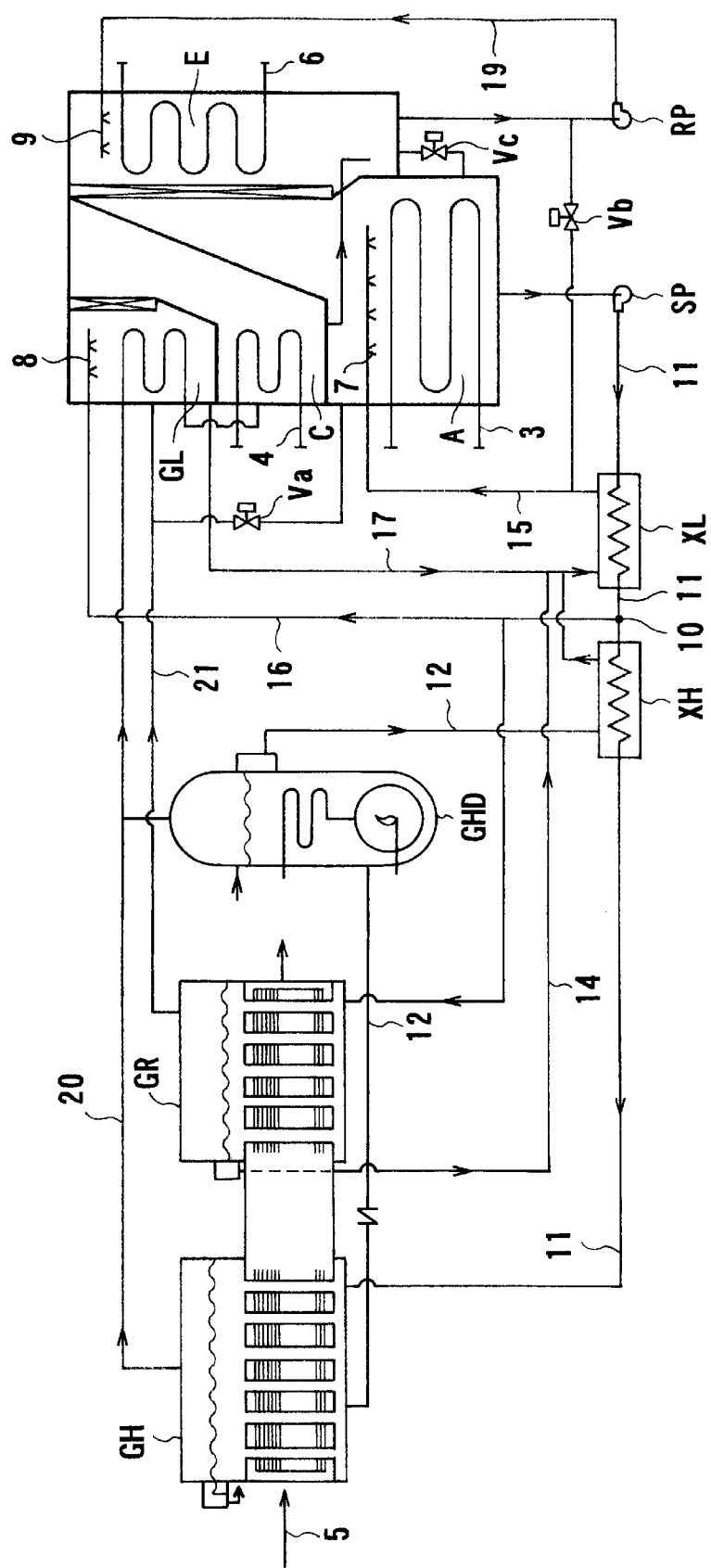
FIG. 10E is a schematic circuit diagram of an absorption cold or hot water generating machine according to a modified embodiment of FIG. 10B.

FIG. 10E shows a modified embodiment of FIG. 10B. In the embodiment shown in FIG. 10E, in the case where heating and cooling capacity is insufficient only by the exhaust gas, a supplemental combustion of fuel or the like can be performed. Specifically, a high-temperature generator driven by fuel is added, and the solution concentrated by the exhaust gas in the high-temperature generator GH is led to a direct fired high-temperature generator GHD. At this time, when fuel is used, the temperature of the exhaust gas is regarded as about 1000 to 1200° C., and the ratio of distribution of the solution to be circulated may be variable.

Next, an absorption cold or hot water generating machine according to embodiments of the fourth aspect of the present invention will be described with reference to FIGS. 11 and 12.

In the high-temperature generator GH and the exhaust heat recovery generator GR, the high-temperature exhaust gas and the solution flow in a parallel current flow. However, it is desirable that the high-temperature exhaust gas and the solution flow in a countercurrent flow.

Figure 11:
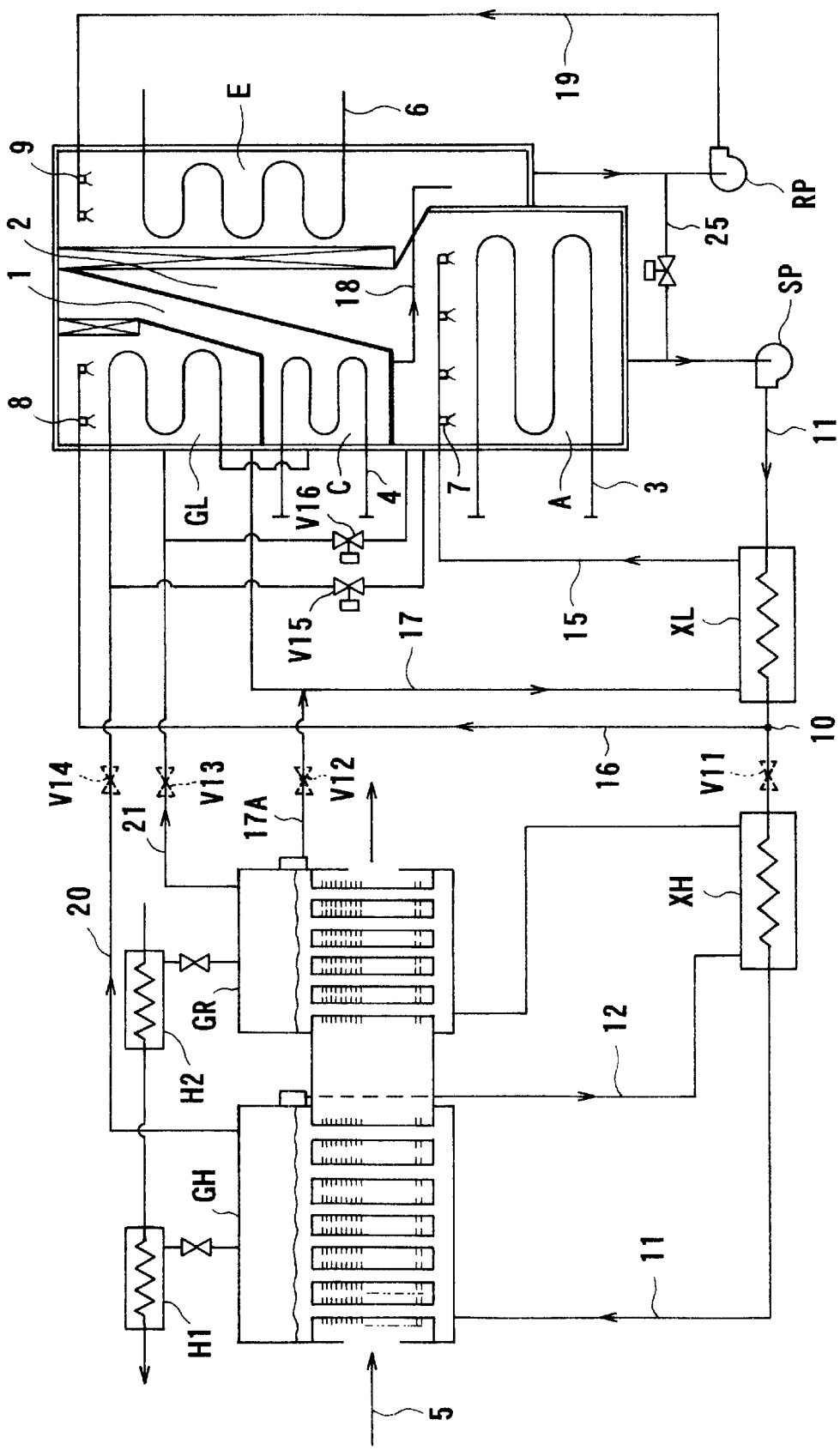
FIG. 11 is a schematic circuit diagram of an absorption cold or hot water generating machine according to an embodiment of a fourth aspect of the present invention.
Figure 12:
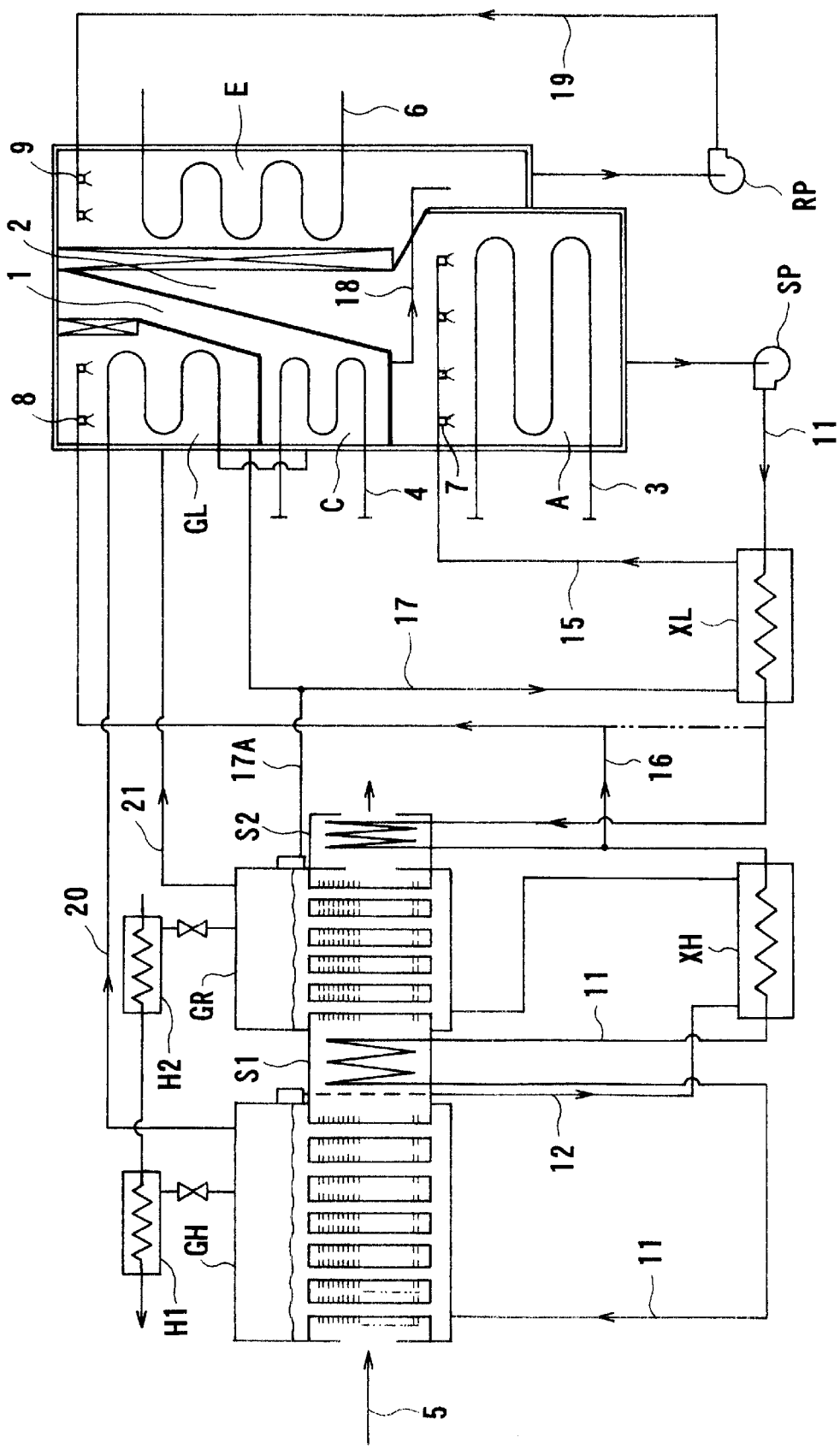
FIG. 12 is a schematic circuit diagram of an absorption cold or hot water generating machine according to another embodiment of the fourth aspect of the present invention.

FIGS. 11 and 12 are schematic circuit diagrams of an absorption cold or hot water generating machine according to embodiments of the fourth aspect of the present invention. The absorption cold or hot water generating machine shown in FIG. 12 differs from the absorption cold or hot water generating machine shown in FIG. 11 in that a heat recovery device S1 is provided in the exhaust gas path between a high-temperature generator GH and an exhaust heat recovery generator GR and a heat recovery device S2 is provided in the exhaust gas path downstream of the exhaust heat recovery generator GR so that a diluted solution to be introduced into the high-temperature generator GH is heated.

In the absorption cold or hot water generating machine shown in FIGS. 11 and 12, there are provided an absorber A, a low-temperature generator GL, a high-temperature generator GH, an exhaust heat recovery generator GR, a condenser C, an evaporator E, a low-temperature heat exchanger XL, and a high-temperature heat exchanger XH. Further, in the absorption cold or hot water generating machine, there are provided a solution pump SP, and a refrigerant pump RP.

In FIGS. 11 and 12, reference characters H1 and H2 represent hot water supply heat exchangers, and reference characters V11, V12, V13, V14, V15 and V16 represent valves. Reference numerals 1 and 2 represent refrigerant vapor passages, reference numerals 3 and 4 represent cooling water circulation passages, reference numeral 5 represents a high-temperature exhaust gas, and reference numeral 6 represents a cold or hot water circulation passage. Further, reference numerals 7, 8 and 9 represent spray pipes, the reference numeral 10 represents a branch point, reference numerals 11 through 17 represent solution passages, and reference numerals 18 through 25 represent refrigerant passages.

Next, operations of the absorption cold or hot water generating machine shown in FIGS. 11 and 12 will be described.

First, in the cold water producing operation, the solution which has absorbed refrigerant is supplied by the solution pump SP from the absorber A to the side to be heated of the low-temperature heat exchanger XL through the passage 11, and then passes through the low-temperature heat exchanger XL and is branched at the branch point 10. Then, a part of the solution passes through the side to be heated of the high-temperature heat exchanger XH, and is led to the high-temperature generator GH through the passage 11. In the high-temperature generator GH, the solution is heated by the exhaust gas 5 discharged from an external gas turbine or the like and serving as a heat source to generate refrigerant and is thus concentrated. Then, the concentrated solution passes through the passage 12 and is introduced into the high-temperature heat exchanger XH. After heat exchange is performed in the high-temperature heat exchanger XH, the concentrated solution is introduced into the exhaust heat recovery generator GR.

The solution which has been introduced into the exhaust heat recovery generator GR is heated by the exhaust gas discharged from the high-temperature generator GH and serving as a heat source and is concentrated, and then flows through the passage 17A and joins the solution flowing through the passage 17.

The remaining solution branched at the branch point 10 passes through the passage 16 and is introduced from the spray nozzle 8 into the low-temperature generator GL. In the low-temperature generator GL, the solution is heated by the refrigerant vapor generated in the high-temperature generator GH and is concentrated. Then, the concentrated solution passes through the passage 17 and joins the solution discharged from the exhaust heat recovery generator GR and flowing through the passage 17A. The combined solution passes through the passage 17 and the heating side of the low-temperature heat exchanger XL and is introduced into the absorber A through the passage 15.

On the other hand, the refrigerant vapor generated in the high-temperature generator GH passes through the passage 20 and is introduced into the low-temperature generator GL, and is condensed in the heat transfer tube bank at the heating side of the low-temperature generator GL and led to the condenser C. The refrigerant vapor generated in the exhaust heat recovery generator GR passes through the passage 21, and joins the refrigerant vapor generated in the low-temperature generator GL, and then the combined refrigerant vapor passes through the vapor passage 1 and flows into the condenser C. In the condenser C, the refrigerant vapor is condensed by heat exchange with cooling water flowing through the cooling water circulation passage 4, and the condensed refrigerant is led to the evaporator E through the passage 18. The water flowing through the cold water circulation passage 6 is deprived of latent heat in the evaporator E, thus making it possible to produce cold water.

Next, the hot water producing operation will be described below. In the hot water producing operation, circulation of the cooling water is stopped and the vapor valves V15 and V16 are opened. Thus, the refrigerant vapor generated in the high-temperature generator GH, the low-temperature generator GL and the exhaust heat recovery generator GR is led to the evaporator E to produce hot water. The refrigerant liquid condensed in the evaporator E is led to the absorber A through the refrigerant passage 25.

Further, in the absorption cold or hot water generating machine according to the present invention, the hot water supply heat exchanger H1 and H2 which utilize the refrigerant vapor generated in the high-temperature generator GH and the exhaust heat recovery generator GR as a heat source are provided, thus making it possible to perform hot-water supply operation. The hot water supply heat exchanger H1 is connected to the high-temperature generator GH by the refrigerant passage, and the hot water supply heat exchanger H2 is connected to the exhaust heat recovery generator GR by the refrigerant passage.

Next, the cold water and hot water supply operation will be described. If a dew point in the exhaust heat recovery generator GR is higher than the temperature of the hot water to be supplied, the refrigerant vapor is condensed in the hot water supply heat exchanger H2 to heat water to be supplied. The condensed refrigerant liquid is returned to the condenser C to contribute to the refrigerating effect in addition to hot-water supply. If a dew point in the exhaust heat recovery generator GR is lower than the temperature of the hot water to be supplied, the refrigerant vapor is not condensed in the hot water supply heat exchanger H2 and heat transfer does not occur.

Because a dew point in the high-temperature generator GH is sufficiently high and the temperature of the hot water to be supplied increases in the hot water supply heat exchanger H1 when any measure is not taken, it is necessary to control the amount of refrigerant to be condensed. Thus, a control valve is provided in a refrigerant path for connecting the high-temperature generator GH and the hot water supply heat exchanger H1 to each other so that the amount of the refrigerant vapor to be introduced into the hot water supply heat exchanger H1 is controlled, and the condensed refrigerant liquid is returned to the condenser C.

Further, in the hot water producing operation and the hot-water supply operation, because the hot water has a relatively high-temperature, a dew point in the exhaust heat recovery generator GR can be ensured at a high temperature and heating of hot water can be easily carried out in the hot water supply heat exchanger H2.

Next, a solo hot-water supply operation will be described. In the absorption cold or hot water generating machine according to the present invention, in addition to the above simultaneous hot-water supply operation, the solo hot-water supply operation can be carried out. In the absorption cold or hot water generating machine according to the present invention, since the absorption solution piping is connected in series to the high-temperature generator GH and the exhaust heat recovery generator GR which perform heat exchange with the exhaust gas, an absorption refrigerating system comprising the absorber A, the evaporator E, the low-temperature generator GL and the condenser C, an exhaust gas generator system comprising the high-temperature generator GH and the exhaust heat recovery generator GR can be separated by a small number of switching valves. Specifically, in FIG. 11, the switching valves V11 to V14 are closed, and the absorption refrigerating system and the exhaust gas generator system are separated from each other and circulation of the absorption solution is stopped.

In the high-temperature generator GH and the exhaust heat recovery generator GR, the solution is heated by the exhaust gas and is concentrated, and the refrigerant vapor generated in the high-temperature generator GH and the exhaust heat recovery generator GR is led to the hot water supply heat exchangers H1 and H2 to heat water to be supplied. The condensed refrigerant liquid is returned to the high-temperature generator GH and the exhaust heat recovery generator GR, respectively. The temperature of the hot water is controlled by regulating the amount of the refrigerant vapor introduced into the hot water supply heat exchangers H1 and H2 through respective control valves provided in the respective refrigerant paths from the high-temperature generator GH and the exhaust heat recovery generator GR. Alternatively, the temperature of the hot water may be controlled by providing a passage switching damper at the upstream side of the high-temperature generator GH and regulating the amount of the exhaust gas introduced into the high-temperature generator GH and the exhaust heat recovery generator GR.

Further, according to the present invention, a two shell structure comprising an exhaust gas heat recovery shell (high-temperature shell) which combines the high-temperature generator and the exhaust heat recovery generator into a single unit, and a low-temperature shell which comprises the absorber, the evaporator, the low-temperature generator and the condenser can be constructed to allow the overall apparatus to be compact.

If the refrigerating capacity is insufficient, a supplementary combustion can be carried out by supplying fuel to a burner provided in the high-temperature generator.

According to the present invention, the high-temperature generator and the exhaust heat recovery generator are connected in series in the exhaust gas path, and the high-temperature generator and the exhaust heat recovery generator are connected in series in the absorption solution path to construct an exhaust gas system generator. With this arrangement, the exhaust gas duct can be prevented from being extended in a complicated manner, and hence the overall structure of the absorption cold or hot water generating machine driven by the exhaust gas can be compact.

Figure 13:
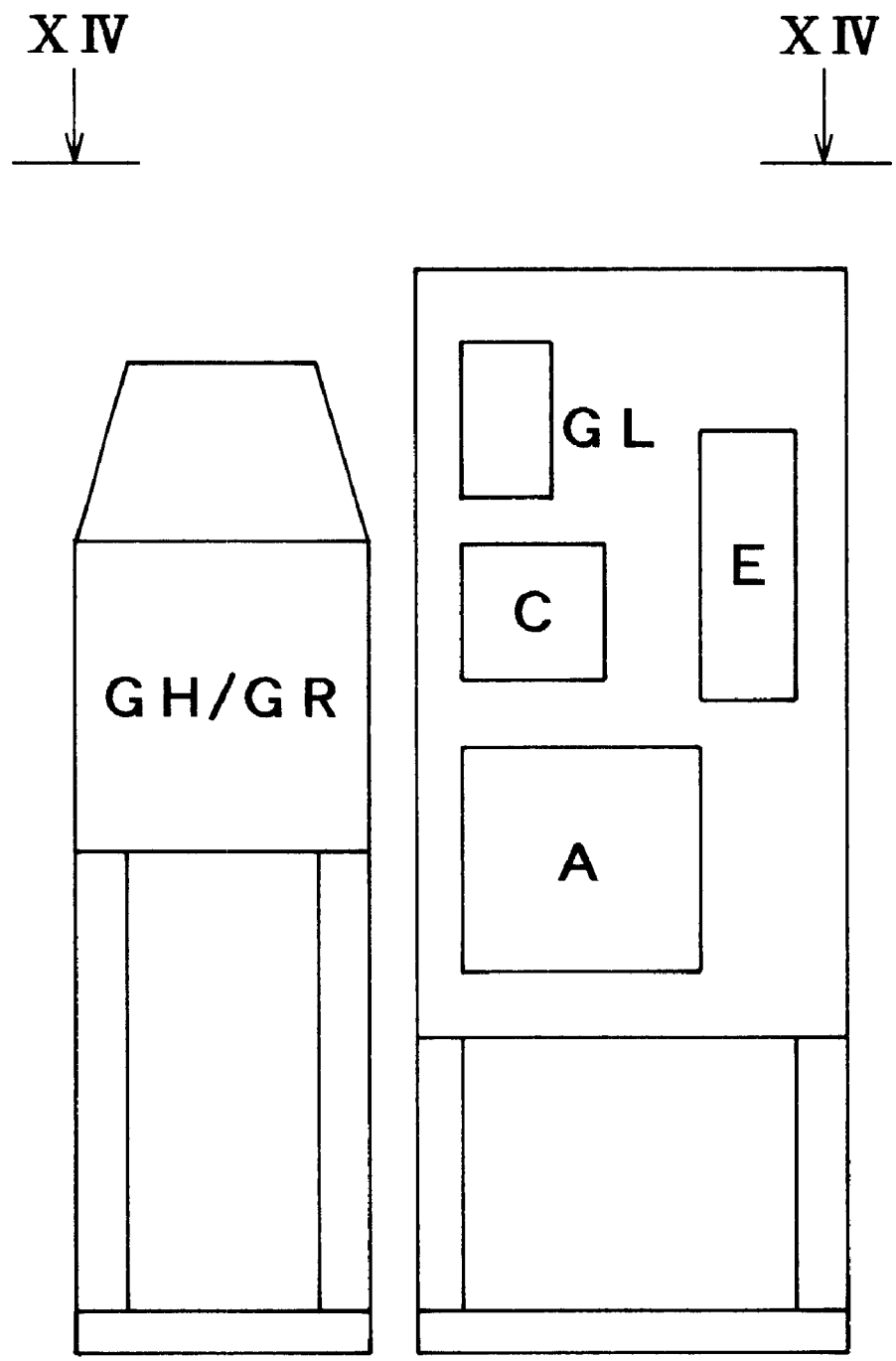
FIG. 13 is a schematic outline view of the absorption cold or hot water generating machine according to embodiments of the first to the fourth aspects of the present invention.
Figure 14:
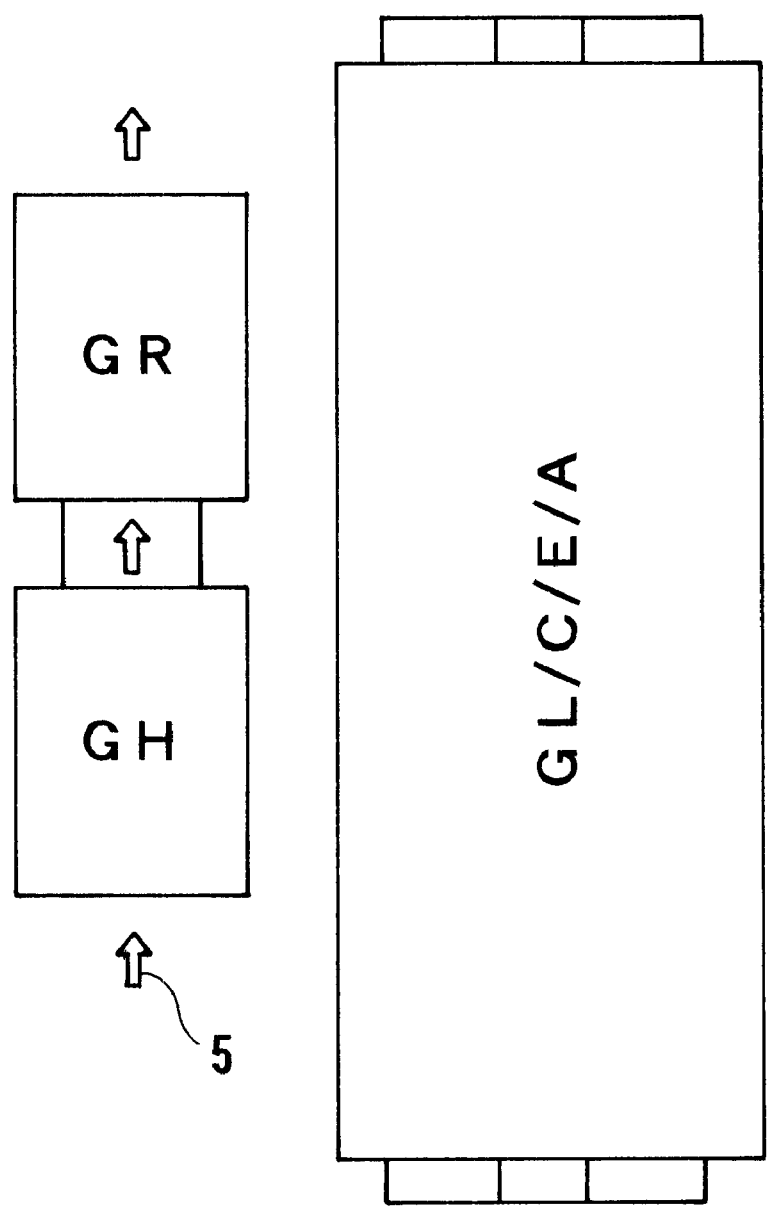
FIG. 14 is a schematic plan view as viewed from line XIV—XIV of FIG. 13.

FIGS. 13 and 14 show an arrangement of the absorption cold or hot water generating machine. As shown in FIGS. 13 and 14, the high-temperature generator GH and the exhaust heat recovery generator GR are arranged along a straight line in a flow direction of the exhaust gas 5. The direction of the straight line, i.e. the flow direction of the exhaust gas 5 is parallel to a longitudinal direction of the shell comprising the absorber A, the evaporator E, the condenser C and the low-temperature generator GL, and hence it is possible to arrange an exhaust gas path in a compact manner.

Although certain preferred embodiments of the present invention have been shown and described in detail, it should be understood that various changes and modifications may be made therein without departing from the scope of the appended claims.

What is claimed is:

1. An absorption cold or hot water generating machine comprising:

an absorber;

a low-temperature generator;

an exhaust heat recovery generator;

a high-temperature generator;

a condenser;

an evaporator;

a solution path and a refrigerant path for connecting said absorber, said low-temperature generator, said exhaust heat recovery generator, said high-temperature generator, said condenser, and said evaporator; and an exhaust gas path for introducing a high-temperature exhaust gas serving as a heat source into said high-temperature generator, and then said exhaust heat recovery generator;

wherein said low-temperature generator comprises a liquid film-type generator in which solution is sprayed on a heat transfer tube bank, and the refrigerant vapor generated in said exhaust heat recovery generator is led to said heat transfer tube bank of said low-temperature generator.

2. An absorption cold or hot water generating machine according to claim 1, further comprising a combustion device provided in said exhaust gas path for combusting fuel supplied from the outside.

3. An absorption cold or hot water generating machine according to claim 2, wherein said combustion device comprises a burner.

4. An absorption cold or hot water generating machine according to claim 1, wherein said absorption solution heated and concentrated by the refrigerant vapor supplied from said high-temperature generator in said low-temperature generator is led to said exhaust heat recovery generator.

5. An absorption cold or hot water generating machine according to claim 1, wherein said solution path includes a path for allowing a diluted solution flowing from said absorber to be branched and to flow to said high-temperature generator and said exhaust heat recovery generator, and a path for allowing said solution heated and concentrated in said high-temperature generator to flow from said high-temperature generator to said low-temperature generator.

6. An absorption cold or hot water generating machine according to claim 1, wherein said solution path includes a path for allowing a diluted solution flowing from said absorber to be branched and to flow to said low-temperature generator and said exhaust heat recovery generator via a low-temperature heat exchanger, and to said high-temperature generator via a high-temperature heat exchanger.

7. An absorption cold or hot water generating machine according to claim 1, wherein said solution path includes a path for allowing a diluted solution flowing from said absorber to be branched and to flow to said high-temperature generator and said low-temperature generator, and a path for allowing said solution heated and concentrated in said high-temperature generator to flow from said high-temperature generator to said exhaust heat recovery generator.

8. An absorption cold or hot water generating machine comprising:
   an absorber;
   a low-temperature generator;
   an exhaust heat recovery generator;
   a high-temperature generator;
   a condenser;
   an evaporator;
   a solution path and a refrigerant path for connecting said absorber, said low-temperature generator, said exhaust heat recovery generator, said high-temperature generator, said condenser, and said evaporator; and
   an exhaust gas path for introducing a high-temperature exhaust gas serving as a heat source into said high-temperature generator, and then said exhaust heat recovery generator;
   wherein said solution path includes a path for allowing a diluted solution flowing from said absorber to be branched and to flow to said high-temperature generator and said exhaust heat recovery generator, and a path for allowing said diluted solution heated and concentrated to an intermediate concentration by said high-temperature exhaust gas in said high-temperature generator to flow from said high-temperature generator to said low-temperature generator; and
   wherein said solution having said intermediate concentration led to said low-temperature generator is heated by refrigerant vapor generated in said high-temperature generator and serving as a heat source and is concentrated, and said diluted solution led to said exhaust heat recovery generator is heated and concentrated by said exhaust gas which has passed through said high-temperature generator.

9. An absorption cold or hot water generating machine according to claim 8, wherein said low-temperature generator comprises a liquid film-type generator in which solution is sprayed on a heat transfer tube bank, and the refrigerant vapor generated in said exhaust heat recovery generator is led to said heat transfer tube bank of said low-temperature generator.

10. An absorption cold or hot water generating machine according to claim 8, further comprising a combustion device provided in said exhaust gas path for combusting fuel supplied from the outside.

11. An absorption cold or hot water generating machine comprising:
   an absorber;
   a low-temperature generator;
   an exhaust heat recovery generator;
   a high-temperature generator;
   a condenser;
   an evaporator;
   a solution path and a refrigerant path for connecting said absorber, said low-temperature generator, said exhaust heat recovery generator, said high-temperature generator, said condenser, and said evaporator; and
   an exhaust gas path for introducing a high-temperature exhaust gas serving as a heat source into said high-temperature generator, and then said exhaust heat recovery generator;
   wherein said solution path includes a path for allowing absorption solution flowing from said absorber to be branched and to flow to said low-temperature generator and said exhaust heat recovery generator via a low-temperature heat exchanger, and to said high-temperature generator via a high-temperature heat exchanger; and
   wherein said absorption solution led to said high-temperature generator is heated and concentrated by said high-temperature exhaust gas, said absorption solution led to said exhaust heat recovery generator is heated and concentrated by said exhaust gas which has passed through said high-temperature generator, and said absorption solution led to said low-temperature generator is heated and concentrated by refrigerant vapor generated in said high-temperature generator.

12. An absorption cold or hot water generating machine according to claim 11, wherein said low-temperature generator comprises a liquid film-type generator in which solution is sprayed on a heat transfer tube bank, and the refrigerant vapor generated in said exhaust heat recovery generator is led to said heat transfer tube bank of said low-temperature generator.

13. An absorption cold or hot water generating machine according to claim 11, further comprising a combustion device provided in said exhaust gas path for combusting fuel supplied from the outside.

14. An absorption cold and hot water generating machine comprising:
   an absorber;
   a low-temperature generator;
   an exhaust heat recovery generator;
   a high-temperature generator;
   a condenser;
   an evaporator;
   a solution path and a refrigerant path for connecting said absorber, said low-temperature generator, said exhaust heat recovery generator, said high-temperature generator, said condenser, and said evaporator; and
   an exhaust gas path for introducing a high-temperature exhaust gas serving as a heat source into said high-temperature generator, and then said exhaust heat recovery generator;
   wherein said solution path includes a path for allowing absorption solution flowing from said absorber to be branched and to flow to said high-temperature generator and said low-temperature generator; and
   wherein said absorption solution led to said high-temperature generator is heated and concentrated by said high-temperature exhaust gas, the heated and concentrated absorption solution is led to said exhaust heat recovery generator and is heated and concentrated by said exhaust gas which has passed through said high-temperature generator, and said absorption solution led to said low-temperature generator is heated and concentrated by refrigerant vapor generated in said high-temperature generator.

15. An absorption cold and hot water generating machine according to claim 14, wherein said low-temperature generator comprises a liquid film-type generator in which solution is sprayed on a heat transfer tube bank, and refrigerant vapor generated in said exhaust heat recovery generator is led to said heat transfer tube bank of said low-temperature generator.

16. An absorption cold and hot water generating machine according to claim 14, further comprising a combustion device provided in said exhaust gas path for allowing said high-temperature exhaust gas to pass therethrough, and said combustion device is adapted to combust fuel supplied from the outside.

17. An absorption cold and hot water generating machine according to claim 14, further comprising:
   a heat recovery device provided between said high-temperature generator and said exhaust heat recovery generator for recovering heat from said exhaust gas in said exhaust gas path for allowing said high-temperature exhaust gas to pass therethrough; and
   a heat recovery device provided downstream of said exhaust heat recovery generator for recovering heat from said exhaust gas in said exhaust gas path for allowing said high-temperature exhaust gas to pass therethrough.

18. An absorption cold or hot water generating machine comprising:
   an absorber;
   a low-temperature generator;
   an exhaust heat recovery generator;
   a high-temperature generator;
   a condenser;
   an evaporator;
   a solution path and a refrigerant path for connecting said absorber, said low-temperature generator, said exhaust heat recovery generator, said high-temperature generator, said condenser, and said evaporator; and
   an exhaust gas path for introducing a high-temperature exhaust gas serving as a heat source into said high-temperature generator, and then said exhaust heat recovery generator;
   wherein said solution path includes a path for allowing absorption solution flowing from said absorber to be divided into three parts and to be led to said high-temperature generator, said exhaust heat recovery generator, and said low-temperature generator; and
   wherein the total flow rate of said absorption solution led to said high-temperature generator, said exhaust heat recovery generator, and said low-temperature generator is distributed such that 45 to 70% of said total flow rate of said absorption solution is distributed to said low-temperature generator, and the remaining absorption solution is distributed to said high-temperature generator and said exhaust heat recovery generator at a ratio determined by a temperature of said exhaust gas to be supplied thereto.

19. An absorption cold or hot water generating machine according to claim 18, wherein said remaining absorption solution is distributed such that when said temperature of said exhaust gas to be supplied thereto is Tgas, the ratio of said absorption solution led to said high-temperature generator is $\{Tgas-(150\sim185)\}/\{Tgas-(90\sim120)\}$ within 10 to 90% of said remaining absorption solution.

20. An absorption cold or hot water generating machine according to claim 18, wherein said exhaust gas flowing through said exhaust heat recovery generator and said absorption solution heated and concentrated by said exhaust gas flow in a countercurrent flow.

21. An absorption cold or hot water generating machine according to claim 18, wherein said exhaust gas flowing through said high-temperature generator and said absorption solution heated and concentrated by said exhaust gas flow in a countercurrent flow.

22. An absorption cold or hot water generating machine according to claim 18, further comprising a high-temperature generator for supplemental combustion.

23. An absorption cold or hot water generating machine comprising:
   an absorber;
   a low-temperature generator;
   an exhaust heat recovery generator;
   a high-temperature generator;
   a condenser;
   an evaporator;
   a solution path and a refrigerant path for connecting said absorber, said low-temperature generator, said exhaust heat recovery generator, said high-temperature generator, said condenser, and said evaporator; and
   an exhaust gas path for introducing a high-temperature exhaust gas serving as a heat source into said high-temperature generator, and then said exhaust heat recovery generator;
   wherein said high-temperature generator and said exhaust heat recovery generator are connected along a substantially straight line in a flow direction of said exhaust gas, and said flow direction of said exhaust gas is parallel to a longitudinal direction of a shell comprising said absorber, said evaporator, said condenser, and said low-temperature generator.

24. An absorption cold or hot water generating machine according to claim 23, wherein said low-temperature generator comprises a liquid film-type generator in which solution is sprayed on a heat transfer tube bank, and the refrigerant vapor generated in said exhaust heat recovery generator is led to said heat transfer tube bank of said low-temperature generator.

25. An absorption cold or hot water generating machine according to claim 23, further comprising a combustion device provided in said exhaust gas path for combusting fuel supplied from the outside.

26. An absorption cold or hot water generating machine according to claim 23, wherein said absorption solution heated and concentrated by the refrigerant vapor supplied from said high-temperature generator in said low-temperature generator is led to said exhaust heat recovery generator.

27. An absorption cold or hot water generating machine according to claim 23, wherein said solution path includes a path for allowing a diluted solution flowing from said absorber to be branched and to flow to said high-temperature generator and said exhaust heat recovery generator, and a path for allowing said solution heated and concentrated in said high-temperature generator to flow from said high-temperature generator to said low-temperature generator.

28. An absorption cold or hot water generating machine according to claim 23, wherein said solution path includes a path for allowing a diluted solution flowing from said absorber to be branched and to flow to said low-temperature generator and said exhaust heat recovery generator via a low-temperature heat exchanger, and to said high-temperature generator via a high-temperature heat exchanger.

29. An absorption cold or hot water generating machine according to claim 23, wherein said solution path includes a path for allowing a diluted solution flowing from said absorber to be branched and to flow to said high-temperature generator and said low-temperature generator, and a path for allowing said solution heated and concentrated in said high-temperature generator to flow from said high-temperature generator to said exhaust heat recovery generator.

* * * * *

UNITED STATES PATENT AND TRADEMARK OFFICE
CERTIFICATE OF CORRECTION

PATENT NO. : 6,675,608 B2 Page 1 of 1
DATED : January 13, 2004
INVENTOR(S) : Inoue et al.

It is certified that error appears in the above-identified patent and that said Letters Patent is hereby corrected as shown below:

<u>Title page,</u>
Item [30], Foreign Application Priority Data, please add the following:
-- September 7, 2001 (JP) …………….. 2001-271908 --

Signed and Sealed this

Twenty-seventh Day of April, 2004

JON W. DUDAS
*Acting Director of the United States Patent and Trademark Office*